Nov. 24, 1970 H. B. VOELCKER, JR 3,543,009
BINARY TRANSVERSAL FILTER SYSTEMS
Filed Sept. 5, 1967             14 Sheets-Sheet 1

INVENTOR.
HERBERT B. VOELCKER, JR.
BY Brumbaugh, Free Graves & Donohue
his ATTORNEYS INVENTOR.
HERBERT B. VOELCKER, JR.
his ATTORNEYS

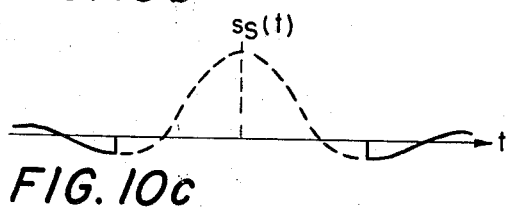
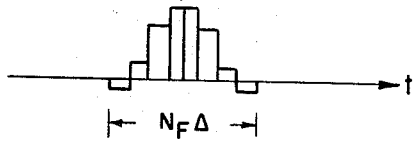
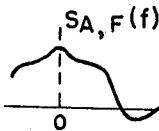
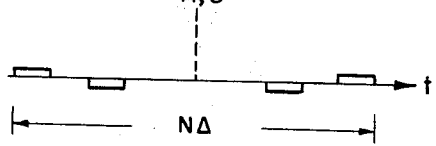
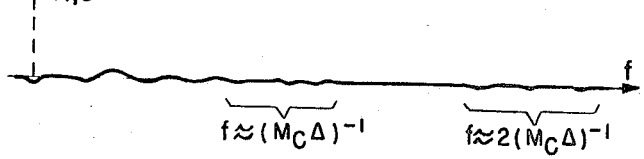
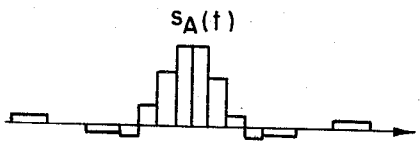
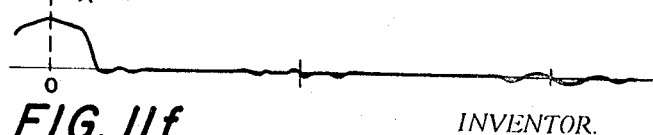

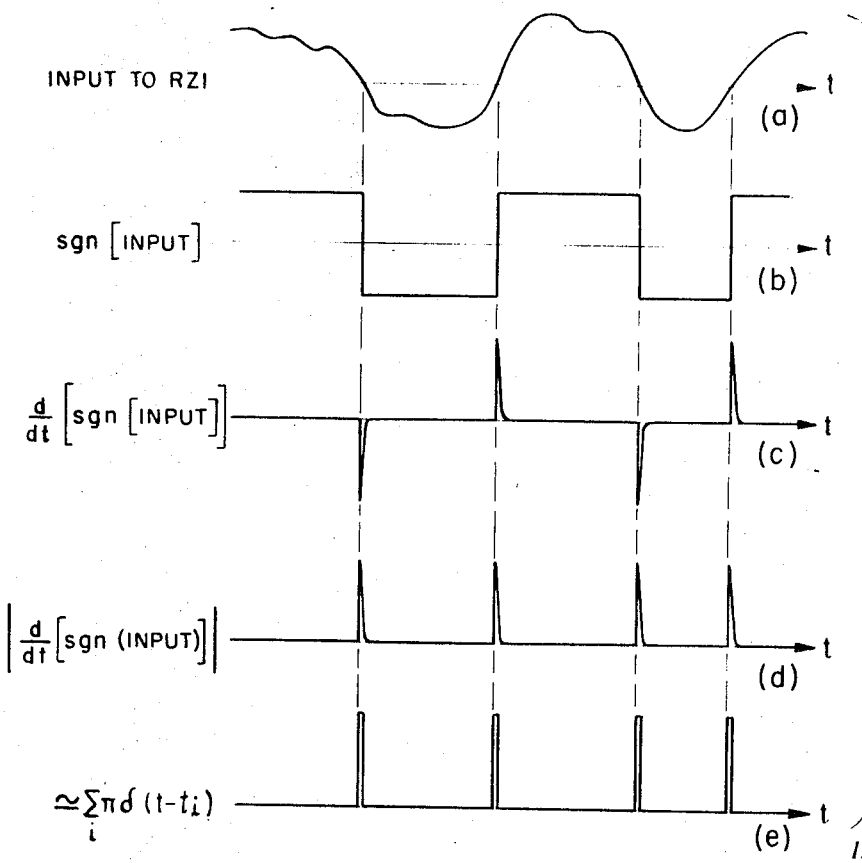

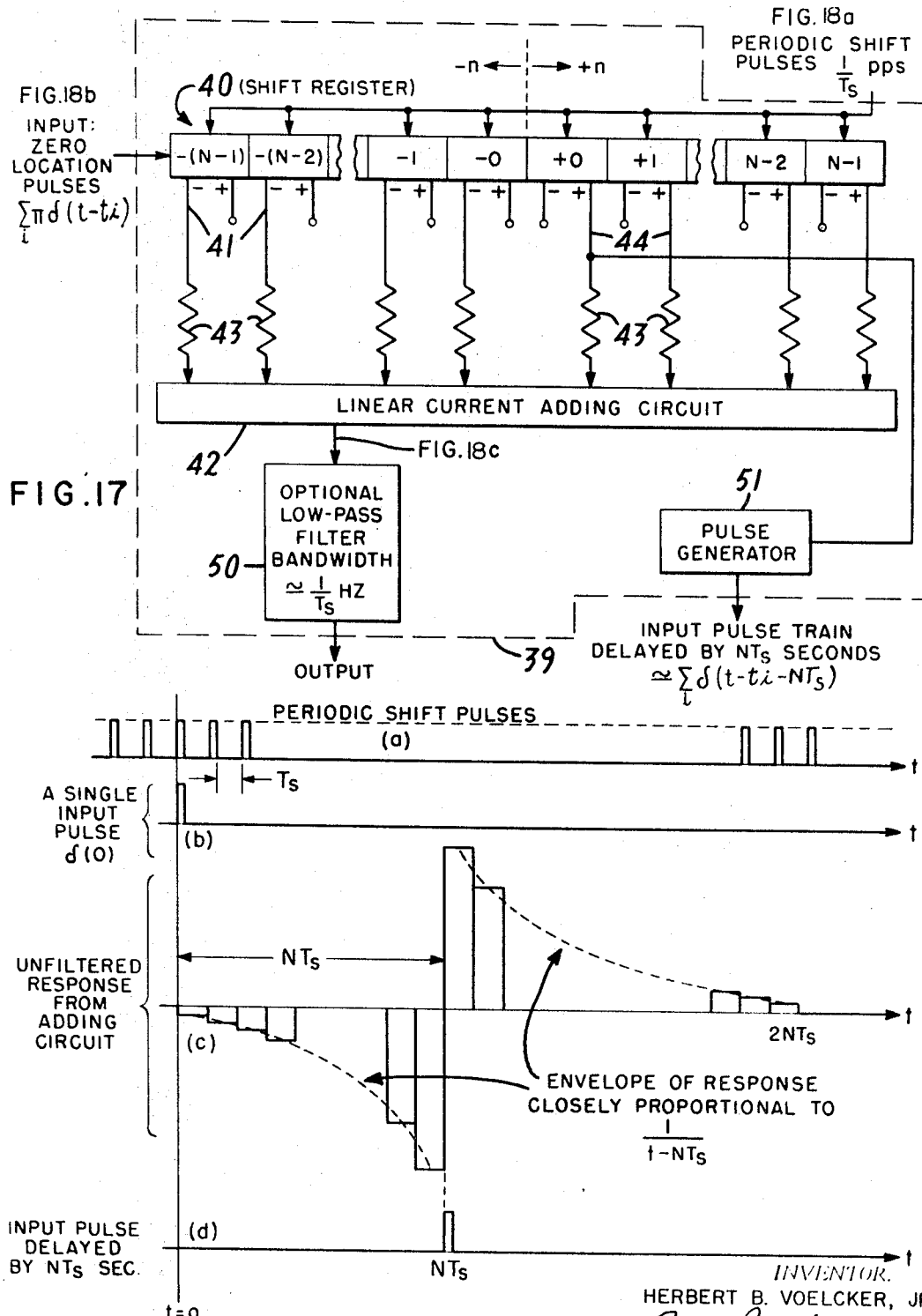

Nov. 24, 1970 — H. B. VOELCKER, JR — 3,543,009
BINARY TRANSVERSAL FILTER SYSTEMS
Filed Sept. 5, 1967 — 14 Sheets-Sheet 11

INVENTOR.
HERBERT B. VOELCKER, JR.
BY Brumbaugh, Free,
Graves & Donohue
his ATTORNEYS

INVENTOR.
HERBERT B. VOELCKER, JR

United States Patent Office 3,543,009
Patented Nov. 24, 1970

3,543,009
BINARY TRANSVERSAL FILTER SYSTEMS
Herbert B. Voelcker, Jr., Rochester, N.Y., assignor to Research Corporation, New York, N.Y., a corporation of New York
Continuation-in-part of application Ser. No. 550,021, May 13, 1966. This application Sept. 5, 1967, Ser. No. 670,503
Int. Cl. G06f 15/34; G11c 19/00; H03k 5/156
U.S. Cl. 235—150.4                                    13 Claims

ABSTRACT OF THE DISCLOSURE

Binary transversal filters in which input pulse units are shifted through stages of shift register at rate faster than rate of pulse units, and stage outputs are weighted by resistors and summed to form a staircase signal. Distortions of signal from desired waveshape minimized by rendering initial signal an approximate derivative of that desired and then integrating or by modifying weighting or by multi-rate shifting of pulse units output. Signals may approximate bandlimited or non-bandlimited functions. Several filters usable together in systems for effecting single side band modulation or multilevel signalling.

CROSS REFERENCES TO RELATED APPLICATIONS

This is a continuation-in-part of my co-pending application, Ser. No. 550,021, filed May 13, 1966.

BACKGROUND OF THE INVENTION

This invention relates generally to methods and means for filtering or otherwise processing one or more pulse units so as to derive output signals therefrom. More particularly, this invention relates to methods and means of such sort wherein the filtering or other processing is accomplished at least in part by digital techniques.

By a "pulse unit" is meant herein a single pulse or, as a substitute therefor, a coded sequence of "1" and "0" pulses which is used redundantly such that the same coded sequence serves as the substitute for each of successive single pulses. That is, the term "pulse unit" is used herein to refer either to a single pulse or to a coded pulse sequence which is the practical equivalent of a single pulse.

One of the most basic operations in data transmission and general signalling is conversion of discrete symbols into prescribed analog waveforms. To express this conversion in broad mathematical terms, the occurrence of the $i^{\text{th}}$ symbol at $t=t_0$, which is denoted by an indexed delta or pulse function, causes an appropriate waveform $s_i(t-t_0)$ to be generated.

The properties of signalling waveforms strongly influence the performance of signalling systems. Indeed, waveforms should be chosen to optimize performance under constraints on such practical parameters as bandwidth, peak voltage, etc., and increasingly powerful theoretical tools for approaching this goal are becoming available. It is unlikely, however, that optimum waveforms will be widely used in practice until commercially viabe means are provided for generating them. They are not now widey used in practice because present-day techniques are often technically and/or economically unsuitable.

Commercial systems now use various combinations of filtering, gating, and conventional modulation to generate signalling waveforms. Symbol-to-signal conversion can be viewed, however, solely in terms of filtering. Specifically, the $i^{\text{th}}$ waveform can be defined as the impulse response of a suitable, not necessarily realizable, linear time invariant (LTI) network. Transversal filters (TF's) are conceptually helpful in this context because their temporal responses are relatively easy to visualize and control.

Considering a typical analog TF provided by, say, an analog delay line having taps spaced therealong, amplifiers each connected to one of such taps to weight the output thereof, and a circuit for summing the outputs of those amplifiers, the impulse response of such a TF is $$h_{\text{TF}}(t) = h_{\text{LP}}(t) * \sum_{n=0}^{N} a_n \delta\left(t - \frac{n}{2W}\right) \quad (1a)$$

$$= \sum_{n=0}^{N} a_n h_{\text{LP}}\left(t - \frac{n}{2W}\right) \quad (1b)$$

where $\delta$ is the Dirac or delta impulse "function," $h_{\text{LP}}(t)$ is the impulse response of the lowpass filter, * means "convolved with," and W is bandwidth (the notation $\pm W$ shall be used to denote bandwidth on a bilateral frequency scale, the corresponding physically measurable parameter or unilateral frequency bandwidth being W Hz.). Almost any reasonable waveform can be approximated via $h_{\text{TF}}(t)$ if the apparatus is sufficiently complicated. The lowpass filtering is often done automatically by exploiting the attenuation characteristics of physical delay lines.

While analog TF's are now coming into commercial servie as equalizers, their cost/complexity probably precludes their widespread use for waveform generation. The [delay]×[bandwidth] product, $T_0W$, provides a figure of merit (and complexity) for a physical analog TF which is roughly analogous to the reactance or simple-section count of an equivalent conventional filter. For reasons which will become evident later, $T_0W$ values of about 10 are required, and values in the range 20–40 are desirable, for generating most potentially interesting waveforms. Unfortunately, the cost of analog TF's, and of analog LTI filters in general, is not a linear function of $T_0W$; it grows increasingly swiftly for $T_0W$ values greater than about 15 or 20. Also, complicated analog LTI filters are essentially fixed-rate waveform generators. If one wants to change the signalling rate significantly, i.e. to scale in time, it is often cheaper to provide new filters than to incorporate adjustment facilities. Thus engineers have tended to use simple suboptimal waveforms which are easy to generate and to time-scale.

SUMMARY OF THE INVENTION

An object of this invention is to effect transversal filtering or other processing of one or more pulse units or other discrete inputs in a manner less costly and/or complex than the techniques now known to the art.

Another object of the present invention is to effect transversal filtering or other processing of one or more pulse units or other discrete inputs which can be readily time-scaled.

These and other objects are realized according to the invention by providing binary transversal filters in which one or more input pulse units are shifted through the stages of a shift register at a rate faster than the fastest rate of occurrence of such pulse units. As an aspect of the invention, the resulting outputs of the stages of the register are weighted by suitable weighting means, and such weighted outputs are summed to derive signals of staircase waveform. One use of such signals is to approximate a desired output signal. Distortion of the staircase signals in relation to the desired signal may be minimized in ways discussed more fully hereinafter, and of which some are: integrating staircase signals which approximate a derivative of the desired signal, employing sophisticated weighting techniques and/or shifting the input pulse units through the register at different rates in different sections of the register.

Binary transversal filters of the sort described are often simpler and/or less costly to construct than an analog transversal filter yielding comparable performance. Further, filters according to the invention can be readily time-scaled by adjusting the shift rate (or rates) of the register and, also, the integrating gain in instances where the staircase signals are integrated. Still further, filters according to the invention are versatile in the sense that one form of staircase signal can easily be replaced by another by simply replacing the previously used weighting means by a weighting means providing a different weighting pattern. As later described in detail, binary transversal filters according to the invention can be utilized in systems for effecting single side band modulation, multi-level signalling and so forth.

BRIEF DESCRIPTION OF DRAWINGS

For a better understanding of the invention, reference is made to the following description of representative embodiments thereof and to the accompanying drawings wherein:

FIGS. 6a–6f are diagrams pertaining to approximation distortion characterizing the signal of the filter of FIG. 5a;

FIGS. 10a–10f and 11a–11f are diagrams illustrative of signal characteristics obtained by the operation of the FIG. 8 filter;

FIG. 12 is a one block diagram of a real zero interpolation system employing a binary transversal filter according to the invention;

FIGS. 14a–14e (collectively designated as FIG. 14) are diagrams of waveforms characterizing exemplary zero-crossing detecting operations which may be used in conjunction with an RZI system such as is depicted in FIG. 12;

FIG. 17 is an exemplary binary transversal filter system providing a hybrid (digital-analog) Hilbert transformation device characterized by the practical signal characteristics shown by FIGS. 16c and 16d;

FIGS. 18a–18d (collectively designated as FIG. 18) are waveform diagrams of the FIG. 17 device;

DESCRIPTION OF THE PREFERRED EMBODIMENTS

Figure 1:
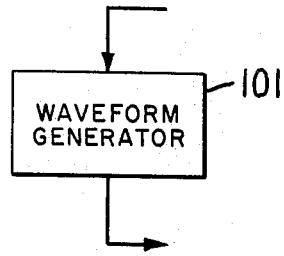
FIG. 1 represents in generalized form a device responsive to an input pulse (FIG. 1a) for generating an analog waveform (FIG. 1b)
Figure 1A:
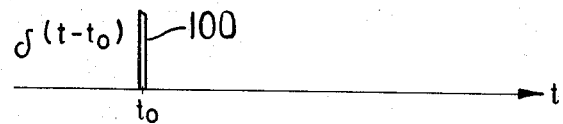
Figure 1B:
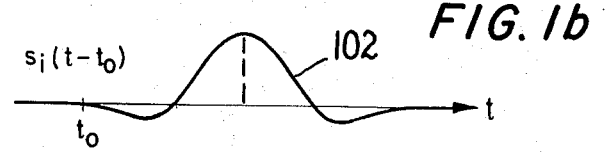

FIG. 1 and the associated diagrams of FIG. 1a and FIG. 1b illustrate in generalized form an apparatus in which the $i^{th}$ of a set of discrete symbols is provided by a delta or pulse function 100 (FIG. 1a) applied to the input of a waveform generator 101. The generator converts the pulse function into an analog waveform 102 (FIG. 1b) of the character $s_i(t-t_0)$ where $t$ is the parameter of time, $t_0$ is occurrence time and $s_i$ generally designates the amplitude of the waveform as a function of time.

Figure 2:
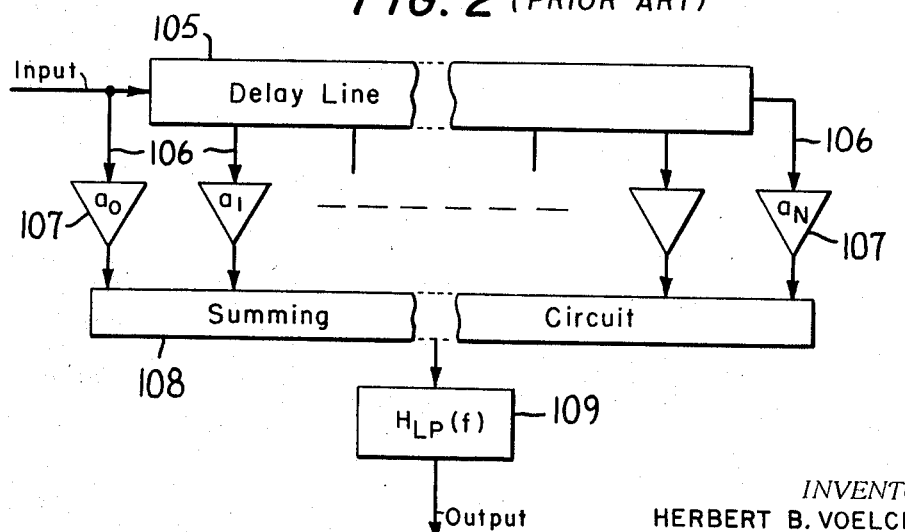
FIG. 2 is a schematic diagram of an analog transversal filter according to the prior art.

FIG. 2 is a schemaitc diagram of a typical analog transversal filter according to the prior art. In the FIG. 2 filter, input signals are supplied to an analog delay line 105 having an effective bandwidth greater than $\pm W$ Hz., a temporal length of $T_0$ seconds and N taps 106 spaced along the delay line to provide a delay between each two adjacent taps of $\frac{1}{2}W$ seconds. Those taps are connected one-for-one with the inputs of N weighting amplifiers 107 providing selected weights for the tap output signals $a_0, a_1, \ldots a_N$. The weighted outputs from the amplifiers 107 are summed by a summing circuit 108, and the resulting sum signal is passed through a low pass filter 109. The impulse response of the FIG. 2 filter is expressed by the previously given Equations 1a and 1b. The shortcomings of an analog transversal filter (TF) of the type shown in FIG. 2 have already been commented on.

BINARY TRANSVERSAL FILTERS FOR APPROXIMATING BANDLIMITED FUNCTIONS

We shall now discuss binary transversal implementation of the "box" 101 in FIG. 1 under the following restrictions:

(1) The $s_i(t)$ signal 102 is bandlimited to $\pm W$ Hz., and (2) The input pulse 100 has a single standard strength (height, energy, or area) and can occur only at instants $t=n/R$, where $n$ is an integer and R is the data rate.

These restrictions pertain to binary synchronous signalling with bandlimited waveforms. Later on we shall discuss systems not subject to those restrictions.

We noted earlier that analog LTI filters afford expensive implementations of the FIG. 1 box. The reason for this is simple: they are far more "general" than the application demands. Specifically, an analog LTI device responds proportionally to a pulse of variable strength whereas we are dealing with pulses having a fixed standard strength. Also, an analog LTI device responds to pulses which occur anywhere in time whereas, to begin with, we assume that we require responses only at specified clock times.

These observations provide the key to a more economical solution than that provided by analog TF's. Clearly, the generator 101 must have "memory," but only for binary events. Also, the memory can be time-quantized because the input pulses are so quantized. Thus we are led to a shift register memory which, with the addition of a resistive summing network becomes a "binary transversal filter."

Figure 3:
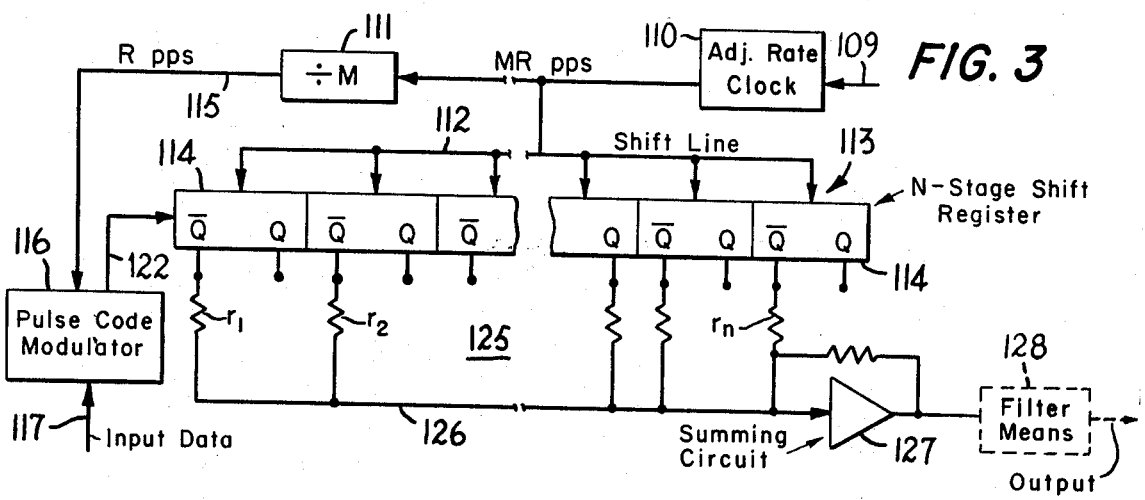
FIG. 3 is a schematic diagram of an exemplary binary transversal filter according to the invention.
Figure 3A:
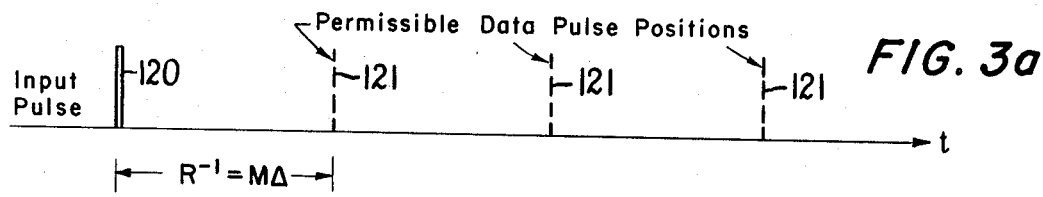
FIGS. 3a and 3b are illustrative of the mode of operation of such filter.
Figure 3B:
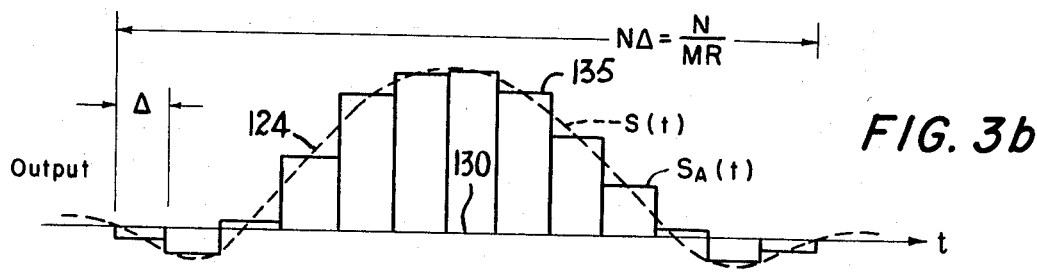

An exemplary BTF apparatus according to the invention is shown schematically in FIG. 3, and the operation of such apparatus is illustrated by FIGS. 3a and 3b. A clock 110 supplies primary clock pulses at the rate of MR p.p.s. to a pulse divider 111 and, as shift pulses, to the shift line 112 of a binary shift register 113 having stages 114 which are N in number. The rate MR of the shift pulses is adjustable in any suitable manner such as, say, manually or by a rate control signal supplied to clock 110 by lead 109. The circuit 111 divides the primary clock pulses by the factor M (which is an integer having a value of 2 or greater) to produce on lead 115 a train of secondary or data clock pulses synchronized with the primary shift pulses and having a rate of R p.p.s. where R is a constant in the FIG. 3 apparatus but need not be a constant in other applications. The data clock pulses are supplied to one input of a source 116 of load pulse units for the register. Source 116 may be, say, a pulse code modulator 116 providing load pulse units consisting of one discrete load pulse per unit. Besides the input for the secondary clock pulses, source 116 has an input 117 for input data which may be, say, a continuous signal representative by variations in its amplitude of variations in a physical quantity being measured. The modulator 116 responds in a conventional manner to the data clock pulses and to the input data to convert the variations of such data into pulse coding provided by the appearance or nonappearance of a discrete data pulse 120 (FIG. 3a) at each of a time succession of data pulse positions 121 having the same rate as and a fixed phase relation with the mentioned secondary clock pulses. Each of such data pulses is of standard height, width and energy content.

The data pulses so generated by modulator 116 are supplied via lead 122 (FIG. 3) to the input of register 113 to be shifted through the register stages 114 by successive virtually instantaneous shifting actions of which each occurs at a time determined by and fixed in phase relation with the occurrence of a primary clock pulse (i.e., shift pulse) on shift line 112. Because of the synchronous relations established between the primary and secondary clock pulses and between the secondary clock pulses and the data pulse positions 121, the pulse shiftings in the register are synchronized with the occurrences of those data pulse positions and, therefore, with the occurrences of any data pulses occupying these positions. The rate, however, at which each data pulse is shifted through the register is MR stages per second so as to be greater by the factor M than R which, being the rate of the pulse positions 121, is the fastest possible rate of occurrence of the data pulses 120. As stated, the factor M is an integer having a value of at least 2, and preferably, a much greater value.

Each data pulse 120 is stored in each of the N stages 114 of the register 113 for a period $\Delta$ equal to $R^{-1}M$ where $R^{-1}$ is the period between adjacent data pulse positions 121 and, hence, is the shortest possible period between two consecutive data pulses 120. FIGS. 3a and 3b show various relationships between $\Delta$, M, N and R. Note that $N\Delta$ is the period required for any given load pulse to pass through all N stages of the register and is, thus, the temporal or operating length of the register.

At this point, it is to be noted that there are ways other than that of FIG. 3 for synchronizing the timing of the shift pulses for the register to the times of occurrence of the load pulses which are shifted. Thus, for example, synchronization may be effected by a master oscillator coupled to the clock 110 and to the modulator 116 to control the rate at which pulses are generated by each. As another example, synchronization may be effected by having modulator 116 (or other source of register input pulses) control the rate at which pulses are produced by the clock 110.

Of course, the source of discrete input pulses for the BTF apparatus need not be a pulse code modulator unit but may be a different kind of pulse source which need not necessarily generate data pulses. Thus, for example, the primary input pulses for the BTF may be a continuous train of uncoded pulses derived from a standard pulse generator and supplied to the BTF for the purpose of generating a desired test or reference waveform by the BTF.

Each of the stages 114 of register 113 has a normal "Q" terminal providing a D.C. output of "voltage" and "no voltage" in the presence and absence, respectively, of a load pulse stored in that stage. Each such stage also has a $\bar{Q}$ terminal providing a D.C. output of "voltage" and "no voltage" in the absence and presence, respectively, of a load pulse stored in that stage.

Connected to the stages of register 114 is a weighting means 125 providing a selected weight for the output of each stage. That weighting means is shown in FIG. 3 as being a matrix or network 125 of resistors $r_1, r_2 \ldots r_N$, whereby the weighted outputs of the register stages are weighted current outputs. Alternatively, however, a matrix of a different kind of weighting elements may be used as, for example, a matrix of active elements such as transistors.

Each of the resistors of matrix 125 corresponds to a respective one of the N register stages and is connected to a "Q" terminal of its associated register stage if positive weighting is desired and to the "$\bar{Q}$" terminal of that stage if the weighting is to be negative. The resistance value of the resistor determines the weighting it imparts. The polarity and magnitude of the weighting to be imparted by each resistor is pre-selected to cause the matrix of resistors to yield an overall weighting pattern which is an approximation to a desired waveform designated generally as $s(t)$. In FIG. 3, the desired waveform is a sinc waveform represented in FIG. 3b by the dash line 124

$$\text{(sinc } x = \frac{\sin \pi x}{\pi x}$$

see chapter 2, Probability and Information Theory by P. M. Woodward, Pergamson Press 1953).

The resistors of matrix 125 are coupled between register 114 and a common lead 126 connected to the input of a summing means 127 which is shown as being a D.C. operational summing amplifier but which may take some other form as, say, a resistor (not shown) connected between line 126 and ground and having a much lower resistance value than any of the resistors of the weighting matrix. The output of amplifier 127 is the output of the FIG. 3 BTF.

The summing means combines the outputs of the several weighting elements of matrix 125 to derive therefrom an overall output $S_A(t)$ which approximates the desired signal $s(t)$. Where the ideal signal $s(t)$ is a bandlimited signal so as to have a unilateral frequency bandwidth of W Hz., its approximation $S_A(t)$ is, in normal practice, limited to an effective unilateral frequency bandwidth of W Hz. by filter means which may be low pass (with an effective pass of W Hz.) or band pass (with an effective pass band of ±W Hz.), and which may be either part of the suming means 127 or, alternatively, follow the summing means as represented by the block 128 shown by dash lines in FIG. 3. The mentioned filter means need not be of any particular form so that, in lieu of being provided by one or more lumped filters, it can be provided by, say, the overall frequency response characteristic of a communication channel to which $S_A(t)$ is supplied. In the FIG. 3 BTF, the effective unilateral frequency bandwidth of W Hz. of the filtered output is related to the shift rate $\Delta^{-1}$ and temporal length $N\Delta$ characterizing register 114 in that $\Delta^{-1}$ must be equal to or greater than $2W$ and $N\Delta$ must be greater than $W^{-1}$ by the same factor as $\Delta^{-1}$ is greater than W and, preferably, by a much greater factor.

The operation of the FIG. 3 apparatus may be understood by considering what happens in response to the passage through the register of the data pulse 120 shown in FIG. 3a. As that pulse is transferred to one after another of the N register stages 114 by the successive shifting actions induced by the shift clock pulses from clock 110, each stage in turn responds to the presence therein of the pulse to generate a change in D.C. voltage output level both at its "Q" terminal and at its $\overline{Q}$ terminal. If the weighting resistor for that stage is connected to the "Q" terminal thereof, that resistor "sees" the presence of the pulse of that stage as a voltage increase from the terminal and, accordingly, generates on line 126 a current "step" which has a time duration $\Delta$ and a magnitude determined by the resistance of the resistor, and which is positive relative to an average current value represented in FIG. 3b by line 130. On the other hand, if such resistor is connected to the "$\overline{Q}$" terminal of its associated stage, the resistor "sees" the presence of pulse 120 in that stage as a voltage decrease, wherefore the resistor generates on line 126 a current step of period $\Delta$ which, as before, is of a magnitude or weight determined by the resistance of the resistor, but which is negative relative to average current value 130.

The several current steps so generated by the resistors of matrix 125 are summed by amplifier 127 to provide at its output a signal 135 (FIG. 3b) which has a staircase waveform in the sense that it is a time-successive composite of incremental step signals of different level. Such staircase signal has a duration which is evidently longer than the pulse 120 which originated the signal. The shape of the signal is determined in accordance with the weighting pattern provided by the resistors of matrix 125. In FIG. 3b, the shape of the $S_A(t)$ staircase signal 135 is such as to provide an approximation to the waveform of the exemplary desired sinc signal 124.

The BTF of FIG. 3 has several simple but important characteristics which can be gleaned from FIG. 3 plus FIGS. 3a and 3b.

(1) As stated, the output $S_A(t)$ is a staircase or boxcar approximation of the desired continuous signal $s(t)$. The heights of the "stairs" are inversely proportional to the resistances of the various resistors, and the widths $\Delta$ are set by the shift clock which steps the input or load pulse down the register. The availability of complementary stage outputs, Q and $\overline{Q}$, enables one to retain algebraic sign conventions with respect to a constant average output value.

(2) The register obviously must be shifted faster than the data rate (by an integer factor M for practical convenience) if the output is to be a reasonable approximation of $s(t)$.

(3) Because the shifting in the register is synchronous with the occurrence of the pulses 120 shifted therein, each staircase output is fixed in time relation with the pulse which originates it so that the relative timing of successive pulses 120 is accurately reflected in the relative timing of the successive outputs derived from those pulses.

(4) The BTF is linear in a binary sequential sense. That is, input data pulses at any or all of the dotted positions in FIG. 3a give rise to delayed "impulse responses" such that the composite output is the sum of suitably delayed single-pulse staircase approximations. (Binary sequential linearity can be established formally via z-transforms or generating functions, but it is physically obvious from the organization of the apparatus.)

(5) The BTF can be time-scaled simply by changing the clock frequency.

The most obvious potential disadvantage is the intrinsic distortion. We shall show, however, that the nature of the distortion is such that it can be controlled quite precisely, simply, and economically.

It should be noted at this point that we are dealing with hybrid technology, viz., a combination of analog and digital techniques. As one might expect, the methods of analysis draw on both classical LTI lore and the evolving discipline of digital filtering. Sampling theory is the most applicable unified body of knowledge, and we shall exploit it heavily.

APPROXIMATION DISTORTION I

Figure 4A:
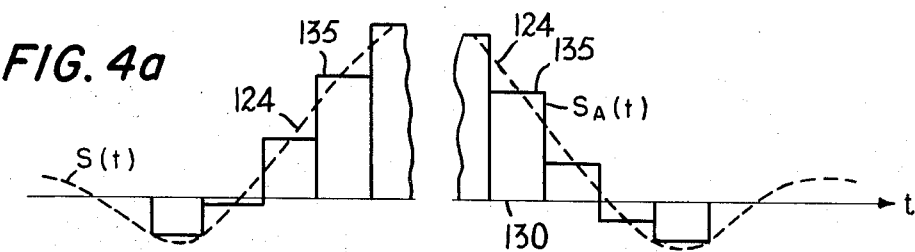
FIGS. 4a and 4b are illustrative of distortions characterizing the staircase signal produced by the filter of FIG. 3.
Figure 4B:
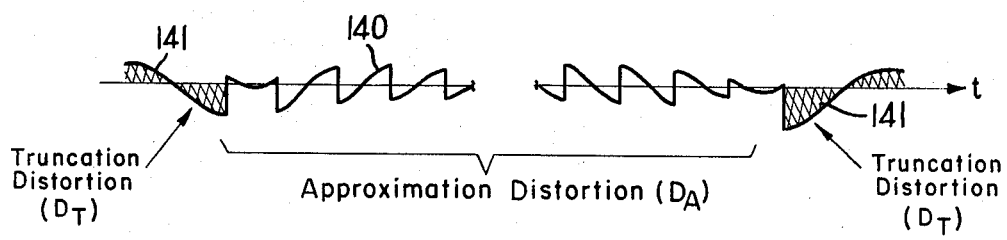

For a finite register of length N (i.e., having N stages), the distortion can be divided into two types as shown in FIGS. 4a and 4b wherein FIG. 4a illustrates an ideal waveform $s(t)$ and its staircase approximation $S_A(t)$ and FIG. 4b illustrates the instantaneous difference in amplitude between waveforms $s(t)$ and $S_A(t)$. Those two types are: *approximation distortion* ($D_A$) 140 associated with the discontinuous nature of the output, and *truncation distortion* ($D_T$) 141 resulting from the ignored "tails" of the desired function. In this section we shall study $D_A$ on the assumption that the register has very many stages.

Figure 5:
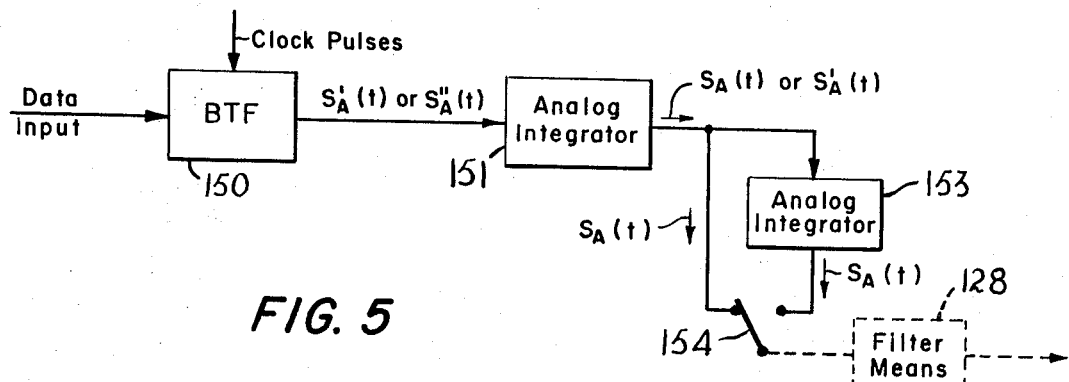
FIG. 5 and FIGS. 5a–5c are diagrams of, respectively, a modification of the FIG. 3 filter and the consequent modification of its operation so as to reduce distortion.
Figure 5A:
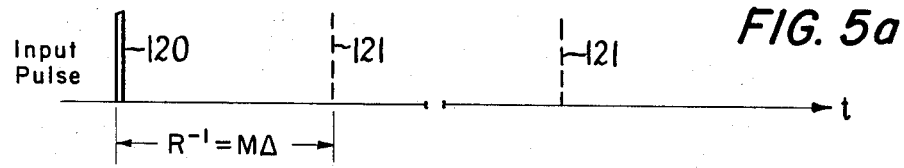
Figure 5B:
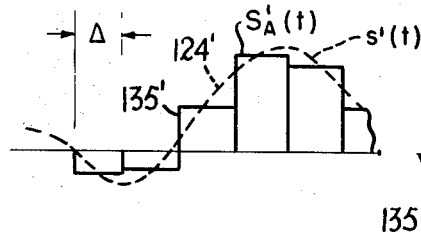
Figure 5C:
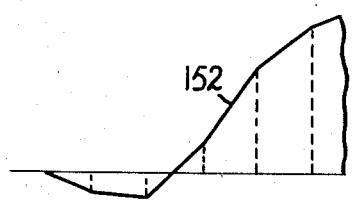

First, however, we introduce the variation on the basic BTF which is shown in FIG. 5. In FIG. 5 modification, the derivative $s'(t)$ of the desired waveform $s(t)$ is approximated by a staircase waveform signal $S'_A(t)$ via a BTF 150 like that shown in FIG. 3, and an analog integrator 151 generates the final straight-line segment approximation $s_A(t)$ which thereafter may be filtered by filter means 128. FIGS. 5a, 5b and 5c show, respectively, the input pulse 120 to the BTF, the approximate and ideal derivatives 135' and 124' of the exemplary desired sinc waveform and the integral 152 (at the output of integrator 151) of waveform 135'. The integrator need not be physically distinct. Its function can be subsumed into the summing amplifier 127 shown in FIG. 3 and incorporated in BTF 150. Integration does not destroy the intrinsic scalability of the apparatus, although the integrator's gain must be increased in proportion to the clock rate if one requires an invariant output amplitude scale. In lieu of using only one integration, the weighting means of BTF may be changed to provide in lieu of $S'_A(t)$ an approximation $S''_A(t)$ to the second derivative $s''(t)$ of $s(t)$, integrator 151 will then yield $S'_A(t)$, and integrator 151 may be connected in cascade with a second integrator 153 which yields $S_A(t)$ when operably connected in circuit by the throwing of an integration selector switch 154.

It will prove fruitful to study $D_A$ in the frequency domain, and, thus, we must express $s_A(t)$ in a readily F-transformable form. By inspection of FIGS. 5a–5c:

$$s_A(t) = \int_{-\infty}^{t} \sum_{m=-\infty}^{\infty} s'(m\Delta) \, \text{rect}\left(\frac{\tau - m\Delta}{\Delta}\right) d\tau \quad (2)$$

where $$\text{rect}\left(\frac{\tau}{\Delta}\right) = \begin{cases} 1, & |\tau| < \Delta/2 \\ 0, & |\tau| > \Delta/2 \end{cases} \quad (3)$$

and where we have assumed a register with an infinite number of stages, a perfect integrator, and have neglected constant time shifts, and where "rect" (and subsequently used mnemonic functions and operators) will be defined and used in accordance with the notation in chapter 2 of the text Probability and Information Theory by P. M. Woodward (Pergamon Press, London 1953).

The integrand in (2) consists of regular samples of $s'(t)$ interpolated by rectangular time functions. This integrand can be cast in sampling theory form by means of the convolution or "sifting" integral.

$$\sum_{m=-\infty}^{\infty} s'(m\Delta) \operatorname{rect}\left(\frac{\tau-m\Delta}{\Delta}\right)$$

$$= \int_{-\infty}^{\infty} \operatorname{rect}\left(\frac{\rho}{\Delta}\right) \sum_{m=-\infty}^{\infty} s'(m\Delta)\delta(\tau-\rho-m\Delta)d\rho \quad (4a)$$

$$= \operatorname{rect}\left(\frac{\tau}{\Delta}\right) * \operatorname{comb}_\Delta s'(\tau) \quad (4b)$$

where $$\operatorname{comb}_\Delta s'(\tau)$$

$$= \sum_{m=-\infty}^{\infty} s'(m\Delta)\delta(\tau-m\Delta) \quad (5)$$

= impulse-sampled ("combed") form of $s'(\tau)$.

Substituting (4b) into (2):

$$s_A(t) = \int_{-\infty}^{t} \left[\operatorname{rect}\left(\frac{\tau}{\Delta}\right) * \operatorname{comb}_\Delta s'(\tau)\right] d\tau \quad (6)$$

This equation can be F-transformed by invoking the following standard rules or pairs.

$$x'(t) \longleftrightarrow 2\pi j f \cdot X(f) \quad (7a)$$

$$\int_{-\infty}^{t} x(\tau)d\tau \longleftrightarrow \frac{X(f)}{2\pi j f} \quad (7b)$$

Convolution $\longleftrightarrow$ Product  (7c)

$$\operatorname{rect}\left(\frac{t}{\Delta}\right) \longleftrightarrow \Delta \cdot \operatorname{sinc} f\Delta = \Delta \frac{\sin \pi f\Delta}{\pi f\Delta} \quad (7d)$$

$$\operatorname{comb}_\Delta x(t) \longleftrightarrow \frac{1}{\Delta} \operatorname{rep}_{1/\Delta} X(f) = \frac{1}{\Delta} \sum_{n=-\infty}^{\infty} X\left(f - \frac{n}{\Delta}\right) \quad (7e)$$

The result is $$S_A(f) = \frac{1}{f} \cdot \operatorname{sinc} f\Delta \cdot \operatorname{rep}_{1/\Delta} f \cdot S(f) \quad (8)$$

whose derivation is depicted in FIGS. 6a–6f.

In those figures, $|s(f)|$ and $|s_A(f)|$ are the moduli of the frequency transformed versions of, respectively, $s(t)$ and $s_A(t)$.

Figure 6A:
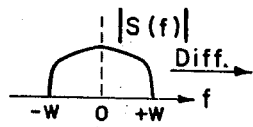
Figure 6B:
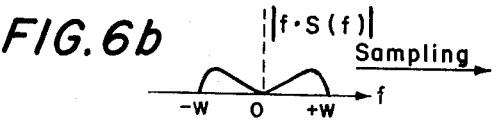
Figure 6C:
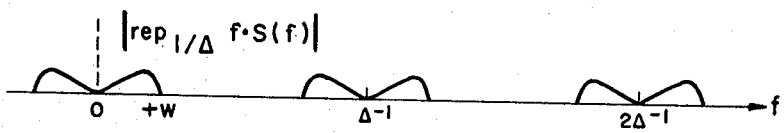
Figure 6D:
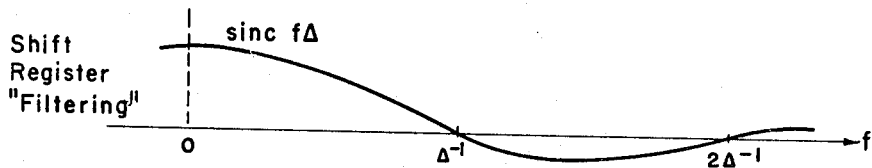
Figure 6E:
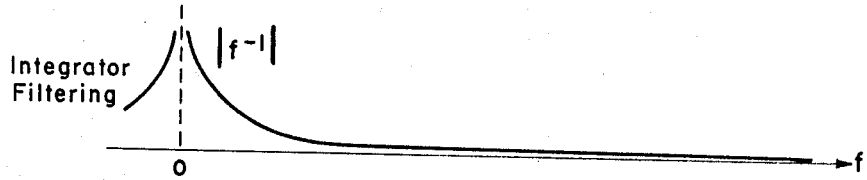
Figure 6F:
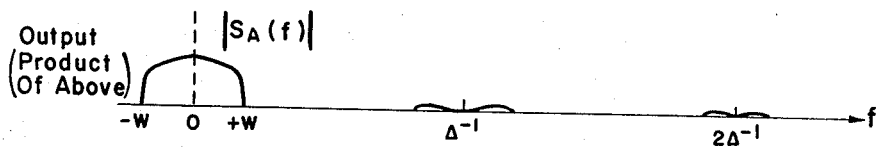

FIG. 6c shows the repetitive spectrum associated with impulse-sampled processes. The sinc $f\Delta$ "filtering" in the next line (FIG. 6d) is attributable to the staircase or stretched-pulse nature of the BTF output. The integrator filtering at $-6$ db/octave (FIG. 6e) is of course familiar. The combination of both types of filtering produces the frequency spectrum shown in FIG. 6f.

Several significant conclusions can be drawn about the nature of the approximation distortion $D_A$.

(1) $D_A$ has two types of components: an in-band component resulting from the "droop" in sinc $f\Delta$ for $|f|<W$, and out-of-band components at harmonics of the shift rate. The in-band component is represented by the difference in shape between $|s(f)|$ and $|s_A(f)|$ (see FIGS. 6a and 6f) in the frequency interval $\pm W$, and the out-of-band components appear in FIG. 6f at and near the frequency values $\Delta^{-1}, 2\Delta^{-1}$ and so on.

(2) Both types of components can be largely removed by LTI filtering. In FIG. 3b, passage of the staircase signal through an inverse-sinc filter in the region $|f|<W$ suffices for the in-band component, while passage of such signal through a sharp lowpass filter will remove the harmonic distortion. In lieu of using an inverse sinc filter following the matrix 125 of weighting resistors, those resistors themselves may be modified in their "weights" to provide an inverse sinc filtering effect as well as providing the weight pattern for the desired sinc function. That is, the overall weighting pattern may be of the form $$s(t) * k \cdot F^{-1}\left[\frac{1}{\operatorname{sinc} f\Delta}\right]$$

where $k$ is a proportioning constant, "*" denotes convolution, $F^{-1}$ denotes inverse Fourier transformation, and the term in square brackets is the directed in-band filtering effect. Thus, it can be said that the weighting matrix 125 is capable of acting as its own filter.

(3) The integrator 151 of FIG. 5 is merely a cheap form of LTI filtering which doesn't require tuning, but which may need gain adjustment as noted earlier. It does not change the nature of the basic BTF apparatus of FIG. 3 in any fundamental way. As pointed out one can, if desired, approximate higher derivatives of $s(t)$ via the register and weighting means of the BTF and use correspondingly more integrators in cascade.

Let us define $D_A$ quantitatively as the mean square approximation of error, $$D_A = \int_{-\infty}^{\infty} \left[s(t) - s_A(t)\right]^2 dt \quad (9a)$$

$$= \int_{-\infty}^{\infty} \left| S(f) - \frac{\operatorname{sinc} f\Delta}{f} \operatorname{rep}_{1/\Delta} f \cdot S(f) \right|^2 df$$

$$= \int_{-W}^{+W} |S(f)|^2 \underbrace{\left[1 - \operatorname{sinc} f\Delta\right]^2}_{\text{I}}$$

$$+ \underbrace{\sum_{m=-\infty}^{\infty}{}' \left| \frac{f\Delta}{f\Delta + m} \operatorname{sinc}(f\Delta + m) \right|^2}_{\text{II}} \Bigg] df \quad (9c)$$

where the prime (′) on the sum in 9c signifies that $m \neq 0$. The terms I and II in (9c) are associated respectively with in-band and out-of-band distortion.

For shift rates in excess of about five times the Nyquist rate (i.e. $\Delta^{-1} > 10 W$), $$D_A \sim 5\Delta^4 \int_{-W}^{+W} f^4 |S(f)|^2 df, \Delta \text{ "small"} \quad (10)$$

(10) shows that $D_A$ is less (usually much less) than .05 percent of the energy of $s(t)$ when $\Delta^{-1} \approx 10W$. At these fast rates, $D_A$ is divided about equally between in-band and out-of-band components. If one uses just the basic BTF of FIG. 3 rather than the integrator variant of FIG. 5, one finds that $D_A$ is given by (9c) with the $$f\Delta/f\Delta + m$$

factor in the sum deleted. The in-band distortion is unchanged but the out-of-band distortion is larger. One can also show that BTF approximations of higher derivatives of $s(t)$ followed by more than one integration essentially eliminate out-of-band distortion while leaving the in-band component intact. As stated, however, that in-band component can be eliminated or much reduced by proportioning the weighting pattern of the matrix 125 to provide an inverse filtering effect. When integration is used, one or two integartions is appropriate for most potential applications.

In summary, we might say that approximation distortion is relatively tractable. It can be removed by special LTI filtering or it can be made arbitrarily small by shifting BTF at a sufficiently high rate and by . . . by selecting the weights to give an inverse filtering effect. The latter approach has much merit. One must work in practice, however, with registers having a finite number of stages. If, with such a register, the shift rate is a high multiple of W, then only a portion of the essentially bandlimited waveform $s(t)$ can be approximated by such register of finite length N and finite temporal length $N\Delta$ because strictly bandlimited functions cannot be strictly time-limited. Thus we can defer no longer a study of truncation distortion, $D_T$.

TRUNCATION DISTORTION

Figure 7A:
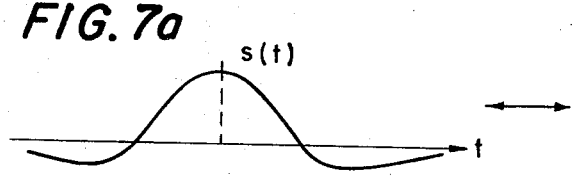
FIGS. 7a–7d are diagrams pertaining to truncation distortion characterizing the signal of the filter of FIG. 5.
Figure 7B:
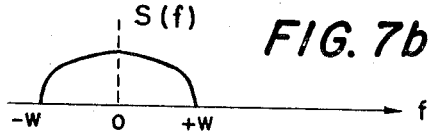
Figure 7C:
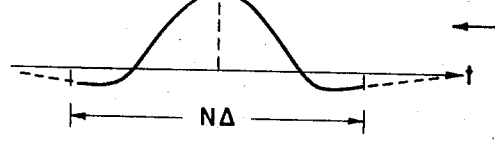
Figure 7D:
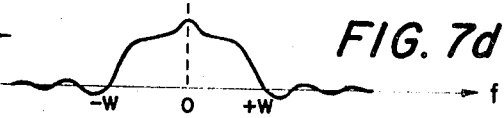

As a first approach to truncation distortion effected by the finite temporal length $N\Delta$ of the register, consider FIGS. 7a–7d. The F-transform of the band-limited function $s(t)$ of FIG. 7a is $S(f)$ shown in FIG. 7b. Function $s(t)$ is truncated by a multiplicative rectangular "window function" of duration $N\Delta$ seconds so as to produce the temporal function $S_N(t)$ shown in FIG. 7c. The spectrum $S_N(f)$ of the truncated function of FIG. 7c is shown in FIG. 7d and follows from (7), viz, $$S_N(f) = N\Delta \int_{-W}^{+W} S(\lambda) \, \text{sinc}\, N\Delta(f-\lambda) d\lambda \quad (11)$$

which yields $S(f)$ only when $N\Delta$ tends to infinity.

The most obvious effect is the smearing of the original $S(f)$ of FI1. 7b into a non-bandlimited spectrum such as is shown for $S_N(f)$ in FIG. 7d. An associated effect is the appearance of "ears" as discontinuities—at the band edges and at $f=0$ in FIG. 7d. In practical terms, the bandwith expansion and the widths of the "ears" are of the order $(N\Delta)^{-1}$ Hz., where $(N\Delta)^{-1}$ is a measure of the *spectral* width of the truncating function.

Truncation can be introduced into the earlier BTF analysis by inserting a truncation function in the integrand in (2) and (6). For an N-stage register shifted at a $\Delta^{-1}$ rate, (6) becomes $$s_{A,N}(t) = \int_{-\infty}^{t} \text{rect}\left(\frac{\tau}{\Delta}\right) * \text{comb}_\Delta \left[ s'(\tau) \, \text{rect}\left(\frac{\tau}{N}\Delta\right)\right] d\tau \quad (12)$$

F-transformation yields $$S_{A,N}(f) = \frac{\text{sinc}\, f\Delta}{f} \cdot \text{rep}_{1/\Delta}\, [f \cdot S(f) * N\Delta \cdot \text{sinc}\, f_N\Delta] \quad (13)$$

For practical parameter values, i.e., a shift rate several times greater than the bandwidth W and a register having an operating length $N\Delta$ several times greater than $W^{-1}$, truncation affects each spectral repetition essentially independently. Thus, considering $S_{A,N}(f)$ which is the spectral pattern (not shown) of $s(t)$ when subjected to both approximation and truncation distortion and which, therefore, would be the spectral pattern for the signal $S_A(t)$ produced by the BTF's process disclosed herein, such pattern $S_{A,N}(f)$ is grossly similar to $|S_A(f)|$ in FIG. 6f with the differences that (1) truncation will distort and smear each separate spectral blob of $S_{A,N}(f)$ in the same way as $S_N(f)$ of FIG. 7d is distorted and smeared relative to $S(f)$ of FIG. 7b, and (2) the regions between repetitions of $S_{A,N}(f)$ will be no longer empty, but the energy therein will be small if the register is temporally long relative to $W^{-1}$.

While one can write formulae analogous to (9) for $D_T$ or for $D_T$ and $D_A$ combined, such formulae are not easy to simplify and evaluate analytically for a general signal $s(t)$. Design studies are best done on a computer, and for this purpose recast forms of (12) and (13) are helpful.

Let us rewrite a portion of the integrand in (12) as follows.

$$\text{comb}_\Delta \left[ s'(\tau) \, \text{rect}\left(\frac{\tau}{N\Delta}\right)\right]$$

$$= \sum_{m=-N/2}^{+N/2} s'(m\Delta)\delta(\tau - m\Delta) \quad (14)$$

This transforms into a F-series, $S_p$, in the F-domain and (13) becomes $$S_{A,N}(f) = \underbrace{\frac{\text{sinc}\, f\Delta}{f}}_{\text{"filtering"}} \underbrace{\sum_{m=-N/2}^{+N/2} s'(m\Delta) \exp(-2\pi j f m\Delta)}_{S_p\text{: periodic in } \Delta^{-1} \text{ Hz.}} \quad (15)$$

$S_p$ can be converted easily into a finite trigonometric series for machine computation. Replacement of the "rep" operator in (13) with a F-series also explains the "ears" which truncation introduces at spectral discontinuities: they are a manifestation of the Gibbs phenomenon.

As we shall illustrate later, spectral "ears" can lead to serious practical problems, especially when they occur in the low frequency region of a spectrum. Fortunately, there is a simple method—the application of temporal "tapering" or weighting—to mitigate their effects. [10,13].

Let $w_N(t) \leftrightarrow W_N(f)$ represents a weighting function of duration $N\Delta$ $$w_N(t) = 0, |t| > \frac{N\Delta}{2} \quad (16)$$

which modifies $s(t)$ or $s'(t)$ multiplicatively:

$$s'_{w_N}(t) = s'(t) \cdot w_N(t) \quad (17)$$

In FIGS. 7a–7d, $w_N(t)$ would be a rect. The oscillatory behavior of the tails of its transform, a sinc, will be intimately linked with the Gibbsian "ears." To eliminate the ears, one would like a $W_N(f)$ which has smoothly decaying tails and yet is as narrow as possible. The search for such functions has intrigued a number of researchers, for they are important in spectrum analysis, diffraction theory, and various other fields. Currently popular functions include the triangular (Bartlett or Fejér) function $$w_N(t) = 1 - \frac{2|t|}{N\Delta}, \quad |t| < \frac{N\Delta}{2}$$

$$= 0 \quad , |t| > \frac{N\Delta}{2} \quad (18)$$

which has a sinc-squared transform, and the Hamming and Hanning functions discussed in the text, The Measurement of Power Spectra, by Blackman and Tukey (Dover, New York 1959).

It has been found that triangular temporal tapering in accordance with (18) is quite effective to suppress the spectral ripples characterizing truncation distortion, but that the low frequency cutoff is increased. Hamming weighting makes the ripples almost unmeasurable, at a small additional sacrifice of low frequency response.

Therefore, it is ordinarily desirable to provide that the weighting pattern for the BTF include a tapering component for the purpose of reducing truncation distortion. Its implementation costs almost nothing: one need only modify the resistor values in the basic BTF of FIG. 3. The equations which describe tapered operation are (6) and (15) with $s'(t)$ replaced by $s'_{w_N}(t)$, and (8) with $S(f)$ replaced by $S_{w_N}(f)$.

Summarizing the distortion findings thus far: $D_A$ varies inversely with the ratio of the shift rate $\Delta^{-1}$ to the bandwidth of $s(t)$ and is characterized by inband and spectral repetition components. $D_T$ consists of spectral smearing, plus aberrations near spectral discontinuities which can be mitigated via weighting functions incorporated into the weighting pattern of the BTF as a component of such pattern. $D_T$ varies inversely with the ratio of the register temporal length $N\Delta$ to $W^{-1}$ or, for a fixed number N of stages and fixed $W^{-1}$, directly with the shift rate $\Delta^{-1}$. The total distortion is approximately $D_A + D_T$ (for practical parameter values).

The parameters available (thus far) to minimize total distortion are the register size N, the shift rate $\Delta^{-1}$, and the weighting function $w_N(t)$. One can optimize the performance of a BTF apparatus by minimizing $D_A + D_T$ with N fixed, by minimizing N when the D's are fixed by the constraints in a particular application, etc. In any event, the cost of the apparatus is approximately proportional to N, and N is analogous to the $T_0W$ dimensionality parameter of analog LTI filters. We can infer from the preceding analysis that N must be of order $10^2$ in most practical applications. An equivalent analog LTI filter would require a $T_0W$ of order 10 to 20. While the dollar cost of the BTF implementation might well be lower than that of the analog LTI version, it is obviously desirable to bring the dimensionality figures into closer agreement. Thus, we pass to a further significant variation on the basic BTF scheme of FIG. 3 or on the FIG. 5 modification of FIG. 3.

APPROXIMATION DISTORTION II

The dimensionality disparity cited above—roughly an order of magnitude—can be attributed to approximation distortion, $D_A$. The $D_T$ mathematics are about the same for both BTF and analog LTI generators: a minimal temporal "length" or memory must be provided to control $D_T$ irrespective of the implementation. Given this fact, a uniform approximation over this interval is wasteful.

As opposed to a uniform approximation, suppose that one varies the *widths* of the "stairs" in FIGS. 3b and 5b, subject only to constraints on the number of stairs (stages) and the overall duration. The mode of stair variation is that of distributing stairs sparsely on the tails of the function and densely in regions where the function has large and rapidly changing values. This approach can be crudely buttressed mathematically via (10). Applying (7a) and Parseval's Theorem to (10) yields $$D_A \sim 5 \left[\frac{\Delta}{2\pi}\right]^4 \int_{-\infty}^{\infty} |s''(t)|^2 dt \qquad (20)$$

which implies that it is desirable to seek a close approximation in regions of rapid, large changes.

Figure 8:
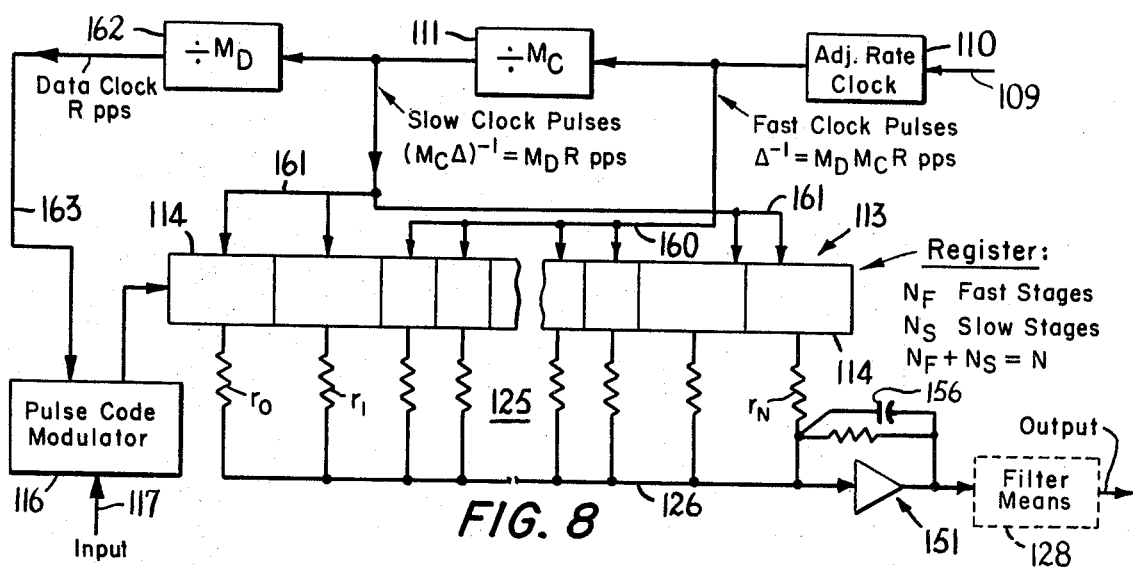
FIG. 8 is a schematic diagram of a modification of the filter of FIG. 5 (or FIG. 3) so as to provide for variable or multi-rate shifting.
Figure 8A:
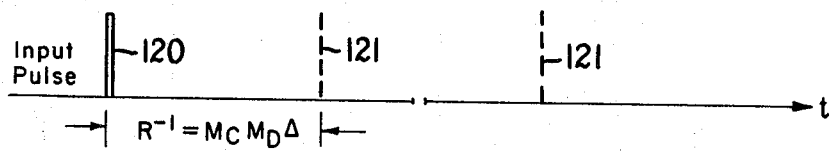
FIGS. 8a and 8b are diagrams illustrative of the operation of the FIG. 8 filter.

This can be done via variable rate or multi-rate shifting, a technique employed in the modification of the FIG. 5 BTF apparatus which is shown by FIG. 8.

The apparatus of FIG. 8 is like that of FIG. 5 in that the weighting pattern of resistor matrix 125 is selected to yield (in response to each data pulse from pulse source 116) a staircase signal $s'_A(t)$ which approximates the first derivative of the desired signal $s(t)$, and which is integrated by summing and integrating amplifier 151 to yield the signal $S_A(t)$ approximating $s(t)$. As alternatives, the weighting pattern of matrix 125 may be chosen to yield $S_A(t)$ directly (in which case amplifier 151 is rendered a summing amplifier only by removal of its integrating capacitor 156) or the weighting pattern may be chosen to yield $S''_A(t)$, and the resulting output $S'_A(t)$ of integrator 151 be subjected to the action of a second integrator 153 (see FIG. 5) to thereby arrive at $S_A(t)$.

The principal difference between the FIG. 8 system and the earlier described systems is that in FIG. 8 the shift pulses at the output of clock 110 have a rate $\Delta^{-1}$ of $M_D M_C R_{p.p.s.}$ and are fed via shift line 160 only to a group of consecutive stages 114 of register 113 which are in the central section of the register. The stages at the two ends of the register are served via shift line 161 by shift pulses from the output of pulse divider 111 and having a rate of $M_D R_{p.p.s.}$. The last named pulses are also fed to another pulse divider 162 which derives from them a train of synchronizing data clock pulses having a rate of $R_{p.p.s.}$ and fed via lead 163 to the data pulse source 116. Each of the factors $M_c$ and $M_d$ is an integer which is at least 2 and is preferably greater in the case of $M_D$. Because $M_C$ and $M_D$ are each integers, the shifting of data pulses through register 113 is synchronized with the occurrences of those pulses.

From the foregoing, it will be evident, that the two-speed register of FIG. 8 has a "fast" central section of $N_F$ stages and "slow" extremities totaling $N_S$ stages. Its single pulse response, shown in FIG. 8b, approximates the central lobe of $s(t)$ more closely than the tails. The shift logic which effects this mode of operation is detailed in FIG. 9. The first fast stage, F1, must load by command of the slow clock pulses and it must be cleared $\Delta$ seconds after loading by a command supplied over leads 164 and 165 by a fast clock pulse so that a single "1" of duration $M_C \Delta$ in the leading slow register section 166 will inject but a single "1" of duration $\Delta$ into the fast register section 167. This becomes obvious if timing diagrams are drawn. The command priorities of the specific flip-flops used in the register determine whether the clocks and clear command must be displaced slightly in time, and whether transitional storage is needed. The transition from the fast register section 167 to the second slow section 168 requires no special logic if the number of fast stages is an integer multiple of the clock-rate ratio $M_C$. In the absence of this integer-multiple relationship, time-displaced slow clocks to operate the different slow sections of the register, or equivalent special provisions, are provided.

Figure 9:
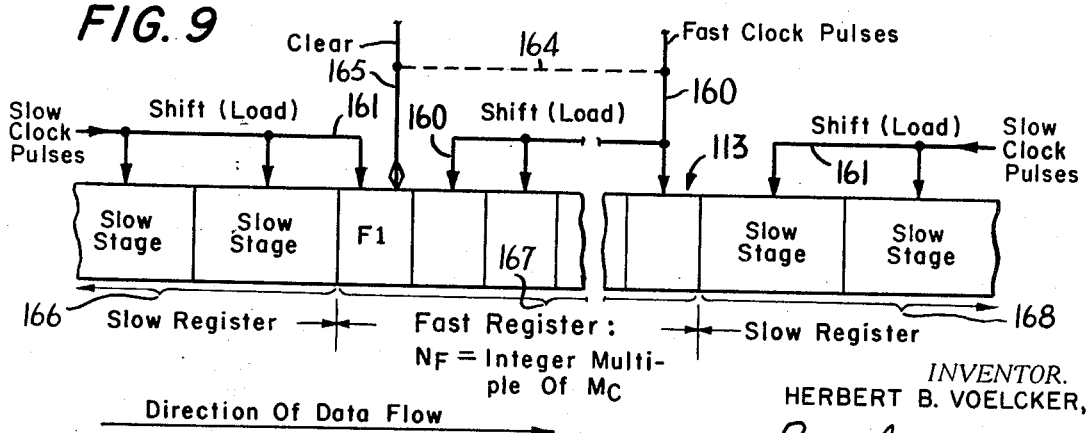
FIG. 9 is a schematic diagram of logic means in the FIG. 8 filter for implementing the multi-rate shifting.

FIGS. 8 and 9 can be generalized easily to incorporate a multiplicity of rates and up/down speed transitions. The cost of such flexibility is quite small if the rate ratios and register-segment lengths are constrained to be powers of 2.

To gain insight into the nature of the improvement offered by variable rate shifting, consider FIGS. 10a–10f. We disregard the staircase approximation, truncation, etc., and simply divide the bandlimited signal $s(t)$ of FIG. 10a into a "fast" portion $s_F(t)$ of FIG. 10b and a "slow" portion $s_S(t)$ of FIG. 10c via the multiplicative functions rect $$\left[\frac{t}{N_F\Delta}\right] \text{ and } 1 - \text{rect}\left[\frac{t}{N_F\Delta}\right]$$

FIG. 10d shows the F-transform of $s(t)$, such transform being $S(f)$ equal to $S_F(f) + S_S(f)$. The spectrum shown in FIG. 10e of $S_F(f)$ is smeared relatively heavily by truncation. The tail spectrum $S_S(f)$ shown in FIG. 10f contains low energy "correction" components which can cancel the smearing.

FIGS. 11a–11f correspond to, respectively, FIGS. 10a–10f but broaden FIGS. 10a–10f by being concerned with the fast component $S_{A,F}(t)$ and slow component $S_{A,S}(t)$ of $S_A(t)$ and with the corresponding F-transforms $S_{A,F}(f)$, $S_{A,S}(f)$ and $S_A(f)$, respectively, so as to include the staircase approximation and overall truncation (but not, for the sake of simplicity, derivative approximation and temporal tapering). From FIGS. 11a–11f and the previous description:

$$s_A(t) = \underbrace{\text{rect}\left(\frac{t}{\Delta}\right) * \text{comb}_\Delta\left[s(t)\,\text{rect}\left(\frac{t}{N_F\Delta}\right)\right]}_{s_{A,F}(t)}$$

$$+ \underbrace{\text{rect}\left(\frac{t}{M_c\Delta}\right) * \text{comb}_{M_c\Delta}\left[s(t)\left\{\text{rect}\left(\frac{t}{N\Delta}\right) - \text{rect}\left(\frac{t}{N_f\Delta}\right)\right\}\right]}_{s_{A,S}(t)} \qquad (21)$$

which transforms into $$S_A(f) = \text{sinc}\,f\Delta \cdot \text{rep}_{1/\Delta}[S(f) * N_F\Delta \cdot \text{sinc}\,fN_F\Delta] \\ + \text{sinc}\,fM_c\Delta \cdot \text{rep}_{1/M_c\Delta} \\ [S(f) * \Delta\{N \cdot \text{sinc}\,fN\Delta - N_F \cdot \text{sinc}\,fN_F\Delta\}] \qquad (22)$$

Observe in FIG. 11f that the desired portion of $S_A(f)$—the blob near $f=0$—is distorted, but only slightly. The slow sections of the register cannot cancel completely the heavy truncation smearing in $S_{A,F}(f)$ because of overall truncation, and because the fast and slow interpolating "filters"—the sinc $f\Delta$ and sinc $fM_c\Delta$ factors in (22)—differ. The slow sections of the register also contribute relatively low frequency spectral repetition distortion which, fortunately, is not very energetic if the BTF is sensibly designed. Thus, the essence of variable rate shifting is that it allows one to trade truncation distortion for approximation distortion, and vice versa, while achieving some reduction in overall distortion.

Expressions 21 and 22 can be generalized easily to include integration, temporal tapering, and a multiplicity of rates. The resulting equations are very difficult to optimize analytically, however; machine computation is generally needed. Even so, experience to date indicates that variable rate shifting can reduce the BTF/LTI dimensionality disparity by a factor of 2 to 3. Thus the register in a BTF-based generator preferably should contain of the order of $3T_0W$ stages, and, in any event, should have more than 10 stages.

EXAMPLES

A practical example—a BTF-based generator of an approximation to a desired $sinc^2 Wt$ waveform—was prepared to illustrate the foregoing techniques. The function $sinc^2 Wt$ was not chosen entirely arbitrarily, for Amoroso and Montagnana have shown in the article, "Distortionless Data Transmission with Minimum Peak Voltage," (IEEE Trans. Information Theory, vol. IT–13, July 1967), that it possesses two very desirable characteristics as a data-transmission waveform: (1) the peak amplitude of a sequence of $sinc^2 Wt$ functions cannot exceed the amplitude at a sampling point, and (2) such sequences are relatively immune to timing jitter because $sinc^2 Wt$ possesses only second order real zeros. The price paid for these characteristics is a reduction in transmission rate to one-half the Nyquist value, i.e., to W rather than 2W data pulses per second.

The generator itself consisted of a two-speed 40-stage BTF which approximates the derivative of $sinc^2 Wt$, followed by a simple analog summer-integrator. The register had a 2:1 speed ratio and contained two groups of twelve slow sections plus a sixteen-stage fast central section. The clocks operated at 4W and 8W p.p.s.

The discussion so far has been confined to BTF's intended to generate staircase signal approximations of signals $s(t)$ which are bandlimited. For such applications, the shift rate $\Delta^{-1}$ of the register must be equal to or greater than 2W where W is elective unilateral bandwidth of the frequency components constituting the signal $s(t)$. Moreover, the temporal length $N\Delta$ of the register must be greater than $W^{-1}$ by at least the same factor as $\Delta^{-1}$ is greater than W and, preferably, by a substantially greater factor.

For a second example of BTF technology, we turn now to the use of binary transversal filters for approximating a theoretically non-bandlimited function or, more specifically, to the use of such a filter in apparatus for effecting real zero interpolation.

The theory and practice of real zero interpolation is disclosed in my co-pending application S.N. 550,021. To summarize briefly the theory taught therein, it can be shown that any continuous bandlimited signal $s(t)$ which is periodic in a time period T is completely specified (except for scale and polarity) by the real and complex zeros which are the roots of such signal when expressed as a Fourier series polynomial having N terms, there being 2N of such zeros per period T, and the real ones of such 2N zeros being descriptive of the axis or zero crossings of $s(t)$. Further, it can be shown that any such signal $s(t)$ can be factored into two signals $S_{rz}(t)$ and $S_{cz}(t)$ which are characterized by, respectively, only real zeros and only complex zeros, and of which both are periodic in T and have a bandwidth equal to or less than that of $s(t)$, the sum of the bandwidths of $S_{rz}(t)$ and $S_{cz}(t)$ being equal to that of $s(t)$. Still further, it can be shown that, given $s(t)$ or any transformation of $s(t)$ which preserves the original axis crossings of $s(t)$ (such as, say, $Sgn[s(t)]$ which is the same as $Sgn[S_{rz}(t)]$), it is theoretically possible to derive the signal $S_{rz}(t)$ from such axis crossings. Moreover, it has been discovered such deriving of the $S_{rz}(t)$ signal is possible in practice by the use of a procedure referred to herein as "real zero interpolation" (RZI).

The real-zero interpolation (RZI) process of present concern is illustrated very generally in FIG. 12. A set of mathematically describable operations is performed by the RZI "box" in FIG. 12. When furnished with a signal which specifies a set of real zeros, that box will generate a continuous minimum-bandwith signal $s_{RZ}(t)$ having the same real zeros.

Figure 13:
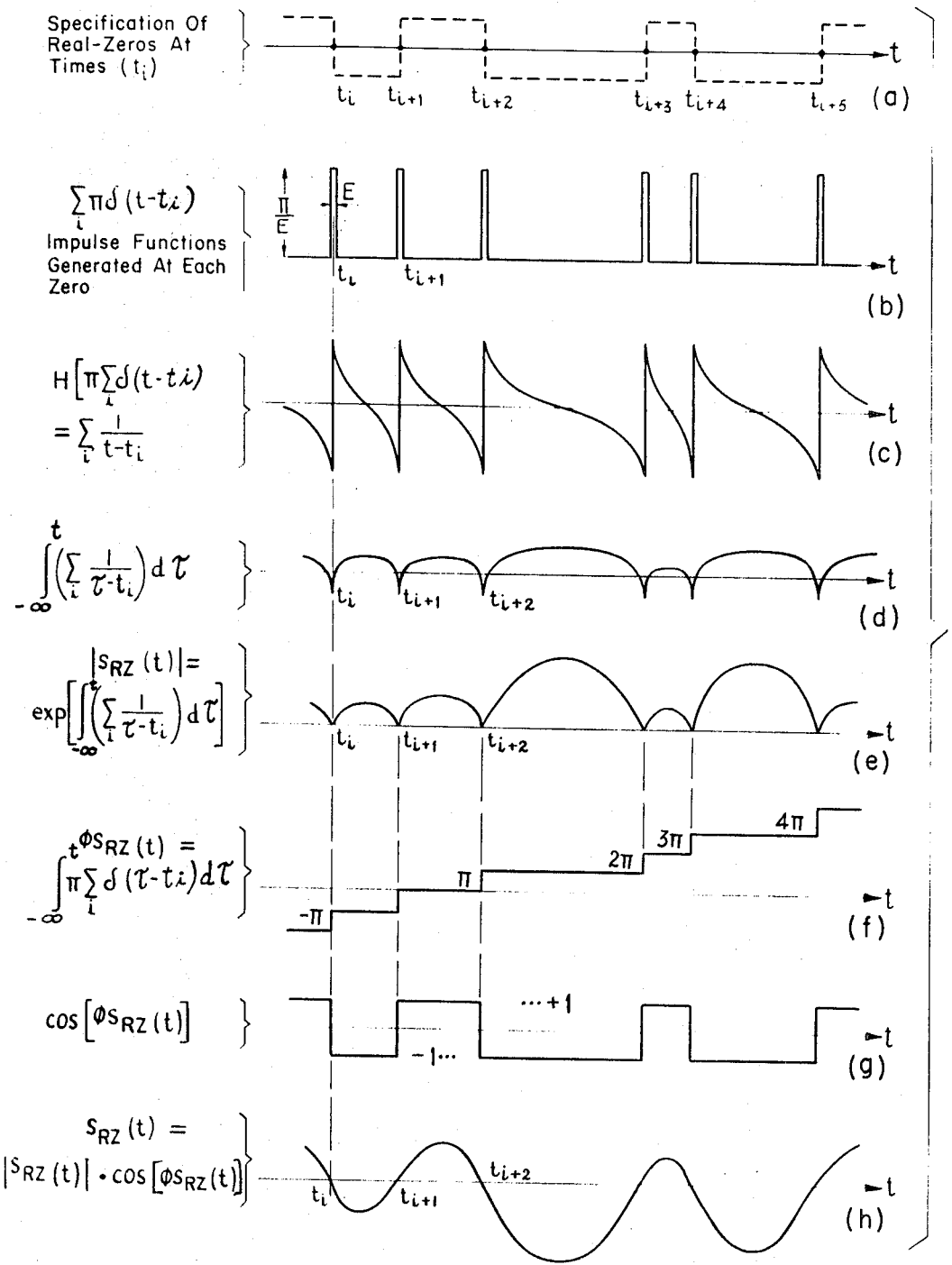
FIGS. 13a–13h (collectively designated as FIG. 13) are diagrams of waveforms characterizing the FIG. 12 RZI system as exemplified by an embodiment thereof.

FIG. 13(a) shows the input real zeros as points at $t= \ldots t_{i-1}, t_i, t_{i+1}, \ldots$ in time. These instants might be conveyed by the zero-crossings of a binary wave (e.g., output of a limiter) as shown by the dotted lines in FIG. 13(a). FIG. 13(h) shows the final signal $s_{RZ}(t)$ which is continuous, essentially bandlimited, and has the prescribed real zeros.

The theory underlying RZI is based on the teachings in my article "Toward a Unified Theory of Modulation, Par I, Phase-Envelope Relations" (Proc. IEEE, vol. 54, No. 3, March 1966) and is as follows.

$$s_{RZ}(t) = |s_{RZ}(t)| \cdot [\phi s_{RZ}(t)] \quad (23)$$

where:

$$|s_{RZ}(t)| \exp\left[\int_{-\infty}^{t} H\left[\sum_i \pi\delta(\tau - t_i)\right] d\tau\right] \quad (24)$$

$$\phi_{s_{RZ}}(t) = \int_{-\infty}^{t}\left[\sum_i \pi\delta(\tau - t_i)\right] d\tau \quad (25)$$

where $\sum_i \pi\delta(\tau - t_i)$ = a sequence of Dirac "delta" functions, of strength $\pi$, located at the specified zeros see FIG. 13(b) and Equations 27 and 28 below, and H is the Hilbert transform of the bracketed term, e.g., $H[x(t)]$ = the Hilbert transform of $x(t)$ $$= \frac{1}{\pi}\int_{-\infty}^{\infty} \frac{x(\tau)}{t-\tau} d\tau \quad (26)$$

where it is understood that the integral in Equation 26 is to be interpreted in the Cauchy-principal-value sense.

The following points are explanatory; see FIGS. 13a–13h.

(a) Note that $s_{RZ}(t)$ is, by Equations 23, 24, and 25, only a function of the real zeros, i.e., the points $\ldots t_{i-1}, t_i, t_{i+1} \ldots$ (b) the $\delta$ functions at the real zeros (see FIG. 13b) can be thought of as being defined by $$\pi\delta(t - t_i) = \frac{\pi}{\epsilon}, \quad \left(t_i - \frac{\epsilon}{2}\right) < t < \left(t_i + \frac{\epsilon}{2}\right) \quad (27)$$

$$= 0, \text{ elsewhere}$$

$$\int_{-\infty}^{\infty} \pi\delta(t - t_i) dt = \pi \quad (28)$$

where $\epsilon$ is a very small positive quantity approaching zero.

(c) The Hilbert (H) transform of a $\delta$ function is, from the general Equation 26

$$H[\pi\delta(t - t_i)] = \frac{1}{\pi}\int_{-\infty}^{\infty} \frac{\pi\delta(\tau - t_i)}{t-\tau} d\tau = \frac{1}{t - t_i} \quad (29)$$

(This point will be discussed again below; see also Equations 3, 9b of Part I of my paper, "Toward a Unified Theory of Modulation.")

FIG. 13c shows a sum of functions described by Equation 29, the sum being the H-transform of the sequence of impulse functions in FIG. 13b.

(d) FIG. 13d shows the integral of FIG. 13c. Thus, the wave shown in FIG. 13d is the argument of the "exp" function in Equation 24. One might state equivalently that $$\ln|s_{RZ}(t)| = \int_{-\infty}^{t} H\left[\sum_i \pi\delta(\tau - t_i)\right] d\tau \quad (30)$$

where "$\ln$" denotes Naperien logarithm. (Note that a dummy variable $\tau$ is used within the integral of Equations 24, 25 and 30 for clarity.)

Thus FIG. 13d shows the logarithm of the magnitude of the desired output signal.

(e) FIG. 13(e) shows the "exp" function of (24), which is the desired output magnitude $\ldots |s_{RZ}(t)|$.

(f) Turning now to the $\varphi$ function of (25), FIG. 13(f) shows this function, which is the integral of the sequence of $\delta$-functions shown in FIG. 13(b).

(g) FIG. 13(g) shows $\cos |\varphi s_{RZ}(t)|$ which appears in (23). Because "cos" is a "principal-value" function, it merely alternates between $+1$ and $-1$ values at the real zeros.

(h) Finally, FIG. 13h shows the product (23), i.e., product of FIGS. 13e and 13g. This is the desired output wave.

The processes described above are physically unrealizable in a formal sense. However, they can be approximated with practical apparatus as closely as desired, dependent upon the effort and expense committed.

As examples of formal unrealizability, we note that:

(a) $\delta$-functions, which theoretically are infinitely short in duration and infinitely great in amplitude, are nonphysical.

(b) If FIG. 13d represents the log of FIG. 13e, and if FIG. 13e has zeros at $t=t_i$, $t_{i+1}$, etc., then FIG. 13d must have value $-\infty$ at these points because $\log(0) = -\infty$. Clearly, this is physical impossible.

Points such as the above do not, however, pose particularly serious problems in practice.

The operations specified in (23)–(25) for generating $s_{RZ}(t)$ can be rearranged to some extent. For example, the argument of the "exp" in Equation 24 can be written (from Equation 29):

$$\int_{-\infty}^{t} H\left[\sum_{i} \pi \delta(\tau - t_i)\right] d\tau = \int_{-\infty}^{t} \sum_{i} \frac{1}{\tau - t_i} d\tau \quad (24a)$$

Similarly $$\int_{-\infty}^{t} \sum_{i} \frac{1}{\tau - t_i} d\tau = \sum_{i} \int_{-\infty}^{t} \frac{d\tau}{\tau - t_i} \quad (24b)$$

These relationships demonstrate that the effect of Hilbert transformation, on either a single pulse or a sequence of pulses, is to produce a function, or functions, whose basic component is $1/t - t_i$ (see Equation 29).

Further, equations 24a and 24b show that the desired result can be achieved either by (1) integrating a sequence of function of form $1/t - t_i$, or (2) forming a quence of integrals of $1/t - t_i$. For example, if the means for producing the $1/t - t_i$ function from the real zero indications is a linear time-invariant device, then a single such device together with a single integrating means may be used to treat the entire sequence of real zero indications, thereby to implement Equation 11a.

On the other hand, with a non-linear means to produce $$\int_{-\infty}^{t} \frac{d\tau}{\tau - t_i}$$

such as a suitable programmed digital computer, a plurality of such means, including, for example, repeated use of a subprogram within a single digital computer, can implement Equation 24b.

The following will indicate further the range of mathematical equivalents of the process represented by Equations 23 to 25. The right-hand term of Equation 24b may be approximated at follows:

$$\sum_{i} \int_{t-T_0}^{t} \frac{d\tau}{\tau - t_i} = \sum_{i} [\ln|t - t_i| - \ln|t - T_0 - t_i|] \quad (24c)$$

where the positive constant $T_0$ is large, by a factor of say 10 or 100, compared to the average time interval between zero indications.

Equation 24c illustrates that the integration of the basic function $1/t - t_i$ can be performed directly, resulting in a difference of logarithms. Thus, the argument of "exp" of Equation 24, which is also implicit in Equation 24a, can be implemented without performing a Hilbert transformation or without generating functions of the form $1/t - t_i$.

The functional equivalence mathematically proven above has the practical consequence that certain operations of the real zero interpolation process of the present invention may be arranged in different sequences and/or combined into composite operations, to the extent that they are derivable from Equations 23 to 25. For example, integration can precede rather than follow Hilbert transformation, etc.

We turn now to representative practical apparatus for implementing the RZI process. We discuss this in terms of (23)–(25), with the understanding that variations are possible if said variations are consistent with a description mathematically equivalent to (23)–(25).

First, we shall discuss means for generating the pulses at the input zeroes, i.e., the pulse train shown in FIG. 13b. Let us assume that the input to the RZI is the output of a limiter as shown by the dotted lines in FIG. 13a. If this is not the case, we provide a limiter or infinite clipper in the RZI to generate a wave whose transitions between a $(+)$ and a $(-)$ state denote the real zero points in time of the input wave. FIG. 14a shows the input wave and FIG. 14b the clipped wave. Note in FIG. 14b that:

$$\frac{d}{dt}[sgn \text{ (input)}]$$

is a sequence of pulses of alternating polarity. Such sequence of pulses is shown in FIG. 14c and the modulus of this sequence is shown in FIG. 14d. The FIG. 14d pulses can be obtained by rectification and used "as is." Alternatively, the FIG. 14d pulses can be used to trigger a standard very-narrow-pulse generator so as to produce the pulses shown in FIG. 14e.

Figure 15:
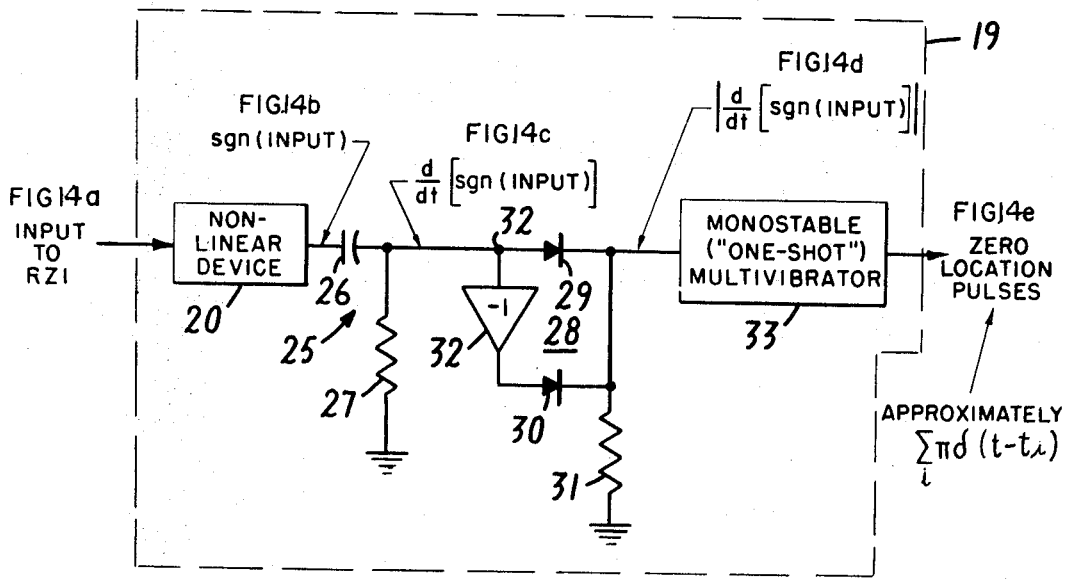
FIG. 15 is a partly schematic and partly block diagram of zero-crossing detector means characterized by the waveforms shown in FIG. 14.

FIG. 15 illustrates the exemplary form of zero-crossing detector apparatus 19 for deriving the FIG. 14e pulses from the waveform of FIG. 14a. In that apparatus, the FIG. 14a waveform is passed through a non-linear device 20 which is preferably (but not necessarily) a limiter, and which transforms the wave to accentuate its zero-crossings to make easier the detection of those crossings. When device 20 is a limiter, the result is shown by FIG. 14b.

The output of device 20 is passed through an RC differentiating network 25 comprised of a capacitor 26 and resistor 27. Network 25 provides alternating polarity pulse signals (FIG. 14c) indicative of the occurrences of the zero crossings of the input wave (FIG. 14a). The alternating polarity pulses are then rectified by a full wave rectifier circuit 28 comprised of (a) a pair of forward conducting diodes 29, 30 having their outputs commonly connected to ground through a resistor 31, and (b) an inverting amplifier 32 interposed between the individual input of diode 30 and the common circuit input 32 for both diodes. Rectifier circuit 28 produces a single-polarity pulse output (FIG. 14d) which drives a monostable or "one-shot" multivibrator 33 to produce the narrow zero-crossing indicating pulses shown by FIG. 14e.

Next considered are means for generating the Hilbert transformation of the zero location pulse train (FIG. 14d or 14e) so as to produce the waveform of FIG. 13c from the FIG. 13b pulses.

Figure 16A:
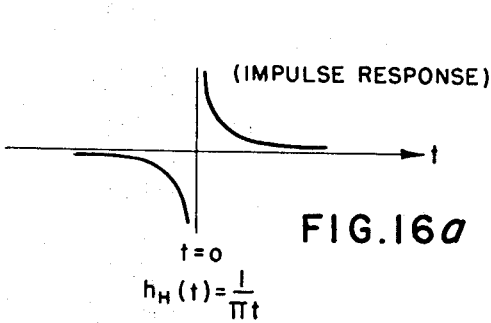
FIGS. 16a–16d (collectively designated as FIG. 16) are diagrams of ideal and practical signal characteristics of an exemplary Hilbert transformation device usable in an RZI system such as is broadly depicted in FIG. 12.
Figure 16B:
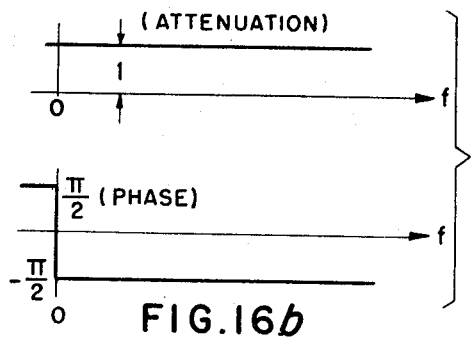

H-transformation is a linear time-invariant operation and thus might be performable by a linear network. FIG. 16a shows the impulse response which an ideal network would have, and FIG. 16b shows the frequency response, i.e., the Fourier transform of the impulse response. Note that FIG. 16b requires only a $-90°$ phase shift; thus an H-transforming network can be thought of as one which converts "cosine" input waves into "sine" output waves. But FIG. 16a shows that such a network is unrealizable because it is non-casual (i.e., has a response before $t=0$) and at $t=0-$ and $t=0+$, its response becomes unbounded.

Figure 16C:
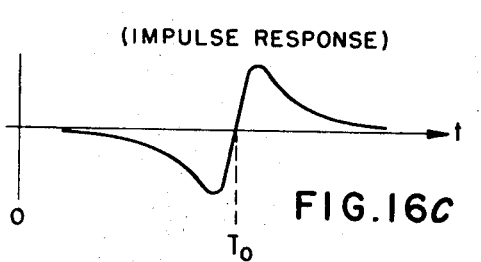
Figure 16D:
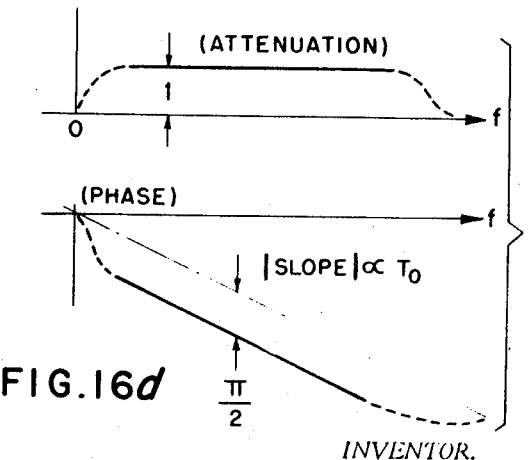

One can, however, approximate the desired characteristics very closely if one permits time delay and requires that the network accept inputs whose frequency components are restricted to a finite passband. FIG. 16c, and FIG. 16d show, respectively, the impulse response and the frequency response of a Hilbert network of $1/\pi t$ form whose response is relayed by $T_0$ seconds and is bandlimited.

Realizable linear networks having characteristics similar to FIGS. 16c and 16d can be synthesized by at least three proven methods as follows:

(1) Delay-line (transversal-filter) techniques as described for different purposes in U.S. Pat. 3,050,700 to Powers and as further described in the article by Gouriet and Newell entitled "A Quadrature Network for Generating Vestigial-Sideband Signals," Proc. IEE (B), vol. 107, pp. 253–260, May 1960.

(2) Single-sideband frequency-translation techniques of the type disclosed by me in my publication "Demodulation of Single-Sideband Signals via Envelope Detection," IEEE Trans. Comm. Tech., vol. Com–14, February 1966.

(3) Use of all-pass networks in cascade. Such networks change the phase but not the magnitude of impressed signals. By using enough all-pass sections, any phase characteristic [e.g. that of FIG. 16d] can be closely approximated over a band of frequencies at the expense of time delay. Synthesis procedures are available in texts on network theory.

It should be noted, however, that for RZI according to the invention, one is not restricted to linear time-invariant changers. That is, because of considerations now to be discussed (especially F3) one can use a very flexible combination of digital and linear-analog techniques. Those considerations are as follows:

F1: Any physical H-transforming device must involve time delay.

F2: Any physical H-transforming device must have a limited passband or frequency response. Stated differently, the device must have limited "resolution" in the time domain, and limited low-frequency response.

F3: In RZI apparatus, we desire only to H-transform "isolated" pulses (at the real zeros of the input) whose heights are a known standard (i.e., are standardized). We do not require that a H-transform device for RZI respond correctly to "any" signal, but only to pulses.

Thus, the apparatus 39 of FIG. 17 is adapted to provide H-transforms suitable for our purposes. That apparatus works as follows in the manner illustrated by FIGS. 18a–18d.

The zero-location pulses are applied to a 2N-stage binary shift register 40. Shifting pulses cause the location pulses to proceed down the register, as a sequence of "0" or "1" states, at a rate of $1/T_s$ stages per second.

The (−) outputs 41 of the first N stages supply currents to an adding circuit 42 through a resistor matrix 43, as do the (+) outputs 44 of the last N stages. The resistors are graded approximately as $[1+2|n|]$ so that the left and right-hand resistors are much larger than the middle pair. By convention, when a stage is in the "0" state it supplies no current to 42; when it is in the "1" state, it will supply a (+) or (−) current to 42 depending on its position in the register and its associated resistor value. FIGS. 18a, b, c show the relevant waveforms when a single pulse is applied at $t=0$ zero location.

The stages of a conventional shift register do not provide what would ordinarily be termed (+) and (−) outputs. Instead, each stage of a conventional shift register has (a) a normal output terminal which yields "no current" and "current" when, respectively, a "0" and a "1" bit are stored in that stage, and (b) a complement output terminal which yields "current" and "no current" for stored "0" and "1" bits, respectively. For a conventional shift register used in the FIG. 17 system, the shown outputs 41 are complement output terminals, and the shown outputs 44 are normal output terminals. When the register is empty (i.e., each stage of the register contains a "0" bit), then no current will flow from any of outputs 44, but a current will flow from each of outputs 41. The sum of the currents from outputs 41 establishes in adding circuit 42 the reference level shown in FIG. 18c for the current or voltage of the waveforms generated when a zero location pulse (FIG. 18b) passes through the stages of the register. That is, as the input pulse passes into the leading stage, the output from the complement terminal 41 of that stage changes from "current" to "no current." That change in current produces (in conjunction with associated resistor 43 and adding cricuit 42) a step-like decrease in current or voltage from the mentioned reference level, and such decrease corresponds to the leading waveform shown in FIG. 18c.

The description just given should make it self-evident how the following stages of the register cooperate with their respective resistors 43 and circuit 42 to produce the other shown step waveforms of current or voltage (FIG. 18c) relative to the shown reference level. The reference level itself may be eliminated from the output of circuit 42 by the use of a biasing or blocking capacitor or the like.

The optional lowpass filter 50 shown in FIG. 17 can be used, with or without re-sampling at its input, to smooth the "staircase" waveform emerging from the adding circuit. The grading of the resistor matrix is somewhat dependent on the actual filter which is used. The analysis and weighting techniques disclosed in the aforementioned article by Gouriet and Newell are applicable to the FIG. 17 device.

The tapering and multi-rate shifting techniques discussed earlier in this document are also directly applicable. In a 500-stage experimental model, for example, the eight central stages of the register were shifted four times faster than the other stages, and triangular weighting was used to smooth the low frequency response.

The FIG. 17 apparatus also furnishes a delayed replica of the input zero location pulses via the pulse generator 51 in FIG. 17 which responds to the leading edge of the output from the "+0" stage of the register. The delayed replica pulse is shown by FIG. 18d.

The "resolution" of the FIG. 17 apparatus is set by the register shifting rate. For (slow) shift pulses at 100 kHz. rate, input zeros at a spacing of $10\mu s$. can be resolved, albeit with some loss of location accuracy. Faster shift rates naturally improve the resolution.

The low frequency response is set by the effective temporal "length" of the register. The low frequency cutoff is approximately $$\frac{1}{2NT_s} \text{ Hz. or } \frac{1}{NT_s} \text{ Hz.}$$

depending on the criterion used and the resistor grading. Thus a 200 stage register operating at $10^5$ shifts/sec. has a low frequency cutoff between 250 and 500 Hz.

The exact relationship between low frequency cutoff of the Hilbert device and the properties of the signal which should emerge from the whole interpolator apparatus under ideal conditions is quite complicated. It is relatively easy to show that if the final output is periodic in T seconds, then the low frequency cutoff of the Hilbert device need only be less than $1/T$ seconds. When the output signal is not periodic, the situation is much more complicated. For many such signals, a Hilbert low cutoff less than the reciprocal of twice the greatest spacing (in seconds) between zero crossings suffices; for other such signals, however, the low frequency cutoff must be lower than this by a factor of 2 or more.

While it is possible to assign a high cutoff frequency to such devices in accordance with a given cutoff criterion, this parameter is less meaningful. The "resolution" referred to above, which is $T_s$, i.e., the reciprocal of the shifting rate or the spacing between shift pulses, is a more useful parameter.

It can be readily shown that the (idealized) final output signal must not contain components at frequencies above $$\frac{1}{2T_s} \text{Hz.}$$

indeed, this upper limit can be achieved only when the desired output signal is a single sinusoid of frequency $$\frac{1}{2T_s} \text{Hz.}$$

For the more complicated signals normally met in practice, the resolution (and hence the shift rate) should be chosen such that the highest component in the signal does not exceed $$\frac{1}{MT_s} \text{Hz.}$$

where M is a number of order 10.

Note that the performance is set by the "complexity" (number of stages) of the register and by its shift rate. For a given complexity, the operating passband can be moved merely by changing the shift rate (and retuning the lowpass filter). The feature just mentioned represents a significant advantage over linear lumped-constant H-networks whose passband is essentially fixed.

Figure 20:
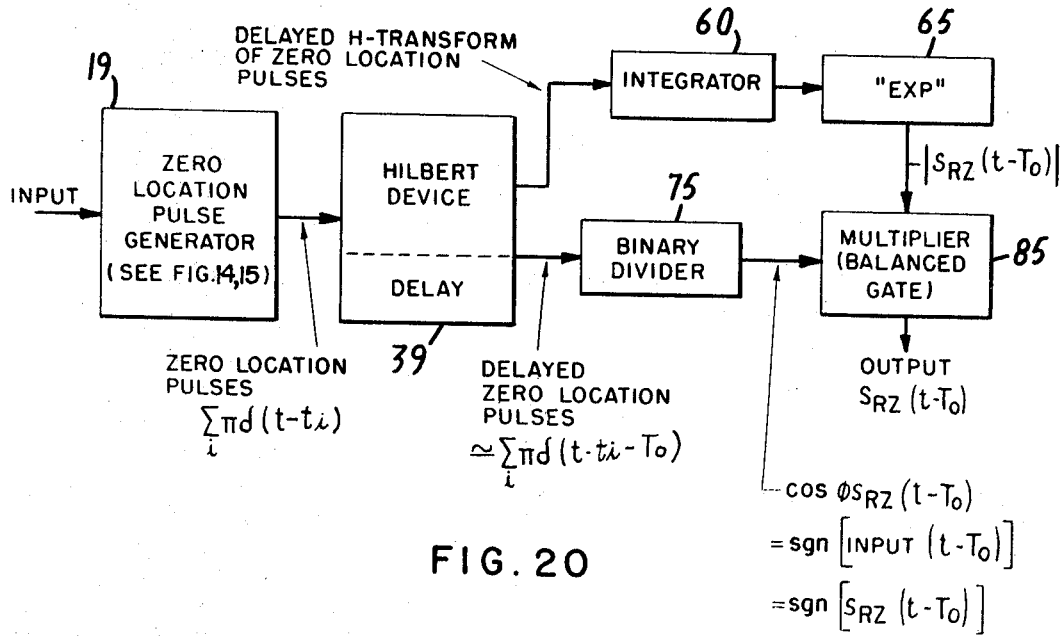
FIG. 20 is an overall block diagram of an exemplary embodiment of an RZI interpolator system such as is broadly depicted in FIG. 12, the FIG. 20 embodiment incorporating as components the circuits shown in FIGS. 15, 17 and 19.

The output of the Hilbert transform device is a succession of signals, each of which is a waveform of the general shape shown by FIG. 16c or (in dashed outline) by FIG. 18c. Those signals are integrated by the device 60 (FIG. 20). The integration can be performed by standard and well known electronic integrating circuits of the analog-computer type, or even by a simple RC network with a very long time constant. For examples of relevant techniques, reference is made to my U.S. Pat. 2,969,183 issued Jan. 24, 1961.

Following the integration, the next operation performed is to generate "exp" (i.e., antilog) of the function shown in FIG. 13d, i.e., to generate the wave corresponding to FIG. 13e. The operation is of itself well known, reference being made in this connection to U.S. Pat. 3,054,073 to Powers.

One way to effect the "exp" generation is to use a general nonlinear function generator, e.g., of the "diode break-point" variety which is widely employed in analog computers.

Figure 19:
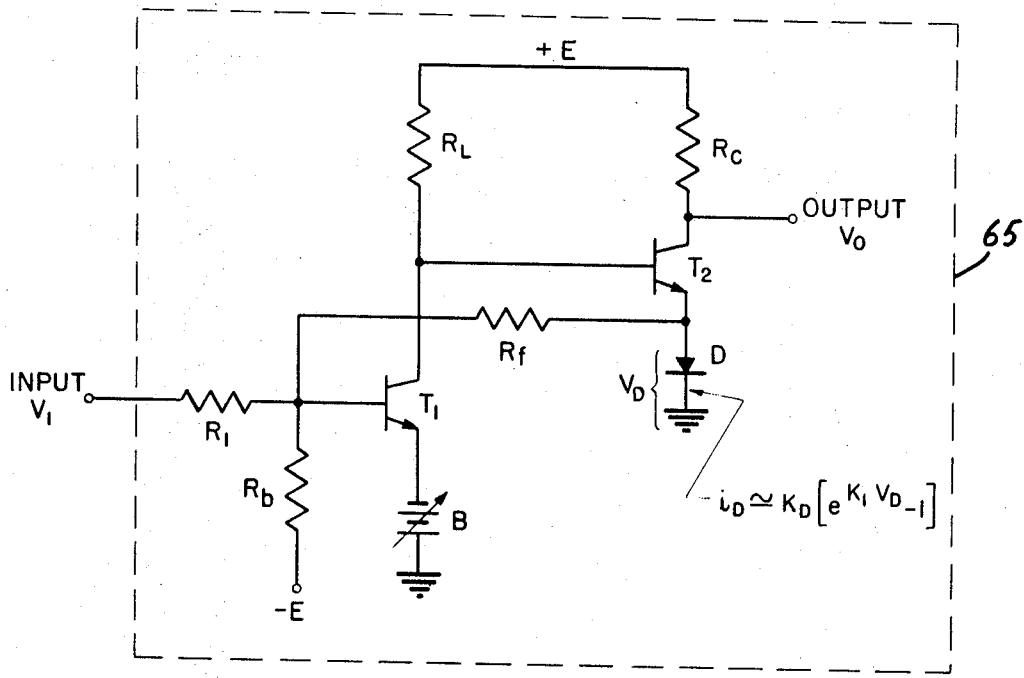
FIG. 19 is a schematic diagram of an exemplary exponentiation circuit usable in an RZI system such as is broadly depicted in FIG. 12.

A simpler and generally adequate technique is to build a special "exp" function generator 65 (FIG. 20) which, for example, exploits the physical properties of forward-biased semi-conductor diodes. FIG. 19 shows representative circuitry for such a generator.

In the FIG. 19 circuit, $T_1$ and $T_2$ are a negative feedback amplifier which develops, across diode D, a voltage proportional to the negative of the input. The current $i_D$ in D is approximately exponentially related to the impressed voltage $V_D$ as shown by the equation on the figure. But, nearly all of the diode current must flow in the collector of $T_2$, and hence the voltage developed across Rc is approximately proportional to $$(-1) \cdot \exp[K_3 \cdot (-1) \cdot (\text{input voltage})]$$

wherein the first and second $(-1)$ terms come from, respectively, the inversion in the transistor $T_2$ and the charge duct, said cutter drum having an outlet opening inversion in the $T_1$ plus $T_2$ feedback amplifier. Note that, if the FIG. 19 circuit is used as shown, then that circuit should have as an input the negative of the signal from the integrator 60 of FIG. 20. Alternatively, numerous other well known amplifier configurations which are not characterized by the mentioned inversions can be used in conjunction with diode D. Note in connection with such diode that the variable bias B sets the operating point on the diode characteristic and ensures that the drive amplifier is biased for linear operation.

Yet another method for exponentiation would be to use conventional high speed digital computing techniques to compute the "exp" of closely spaced samples of the input wave.

The preceding sections describe methods to generate $|s_{RZ}(t-T_0)|$, i.e., the modulus of the desired output delayed by $T_0$. This is a delayed version of FIG. 13e. Recall that the delay $T_0$ is associated with realization of the H-transformation step. Thus, we have one of the factors of a delayed version of (23).

We also desire to produce a delayed version of FIG. 13g, the wave which controls polarity reversal and is the other factor in (23). Observe that, if we merely wished to produce the wave of FIG. 13g without delay, we could do so by applying the zero-location pulses to an ordinary "flip-flop" or binary divider circuit so that we would not produce the wave shown in FIG. 13f. We could, in fact, use the sgn [input] directly as it appears in FIG. 14b as the dotted wave in FIG. 13a.

But we desire to produce a version of FIG. 13g delayed by $T_0$ seconds. To do this, we can either provide a mechanism for (a) delaying sgn [input] by $T_0$ seconds or for (b) delaying the zero-location pulses which, after delay, are "divided" in a flip-flop. The choice depends, in practice, on what means are used to effect the H-transformation in the steps discussed previously. If either the linear technique described (for different purposes) in U.S. Pat. 3,050,700 or the digital technique disclosed herein [FIGS. 17, 18] is used, one can take advantage of delay mechanisms already provided for the new use of H-transformation. For example, in FIGS. 17, 18, means 51 are shown for producing a properly delayed replica of each zero-location pulse. The delayed replica pulses can be applied directly to a flip-flop 75 (FIG. 20) to generate the delayed version of FIG. 13g.

The final step is multiplication by a multiplier means 85 (FIG. 20) of the delayed versions of FIG. 13e and FIG. 13g. One could use well-known analog computer means for that purpose, but simpler methods can also be used because one of the signals to be multiplied has but two amplitude states, $+1$ and $-1$.

Thus, for multiplier 85 one can employ a switched diode quad multiplier sometimes known as a balanced modulator, or a balanced linear gate, or numerous other piece-wise linear circuits wherein the polarity state of the delayed 13g wave is used to select either a positive or negative version of the delayed FIG. 13e wave. Comparing waveforms 13e and 13g, it will be seen that the effect of multiplier 85 is to reverse the polarity of every other signal segment of the succession of signal segments comprising waveform 13e. In this way the multiplier 85 provides at its output the sought-for real zero component signal $S_{RZ}(t-T_0)$, i.e., a delayed version of the signal shown by FIG. 13h.

FIG. 20 illustrates a representative system employing the components and techniques which have been discussed above. Such a system has been tested experimentally and was found to perform in accordance with theory, within the response limitations of its physical components.

As demonstrated in connection with Equations 23 and 25, 23a to 23c, various rearrangements of certain operations of the real zero interpolation process are possible. Also, in the preceding discussion we have tended to disregard amplitude scale factors such as "$\pi$." In practice, such constants are important only at one point in the operations, namely, the nonlinear "exp" circuit 65. Here, by providing an adjustment for the gain of the feedback drive amplifier in FIG. 19 (e.g., by making $R_1$ variable) as well as by providing adjustment for the bias on the diode via B, one can equalize as needed in a very straight forward fashion.

Considering the signal $S_{RZ}(t-T_0)$ which is the output of the FIG. 20 system, such signal is (with a delay $T_0$) the same as the signal $S_{RZ}(t)$ of FIG. 13h. That output has zero crossings which replicate (with a delay $T_0$) the zero crossings of the input signal (FIG. 14a). The overall effect of the FIG. 20 system is to interpolate between the zero crossings of the output signal by consecutive contiguous segments which are alternating in polarity and of which each segment extends over an interval between an adjacent two of such crossings. Each such segment over its respective interval is of single polarity and is mathematically continuous in the sense that, no matter how many times the waveform of the segment is differentiated, the resulting derivative curve is a continuous curve. Also, the peak amplitude of the several segments of the output signal is variable (see FIG. 13h) in accordance with the variable relative occurrences in time (or other dimensional extension of the output signal) of the zero crossings of the output signal. Note, in this connection that the peak amplitude of each segment varies in the same sense as the length of the interval spanned by that segment.

The succession of signal segments form together the signal $S_{RZ}(t-T_0)$ which preserves the zero crossings of the input signal and which is mathematically continuous and bandlimited in the sense that any spurious spectral components (outside the theoretical bandwidth for the signal) can be reduced to as small a value as desired at the price of some increase in the cost of equipment and some increased time delay. Moreover, the described signal $S_{RZ}(t-t_0)$ is the signal of minimum bandwidth which preserves all the zero crossings of the input signal.

It is deemed to be an important feature of the FIG. 20 system that it is a true interpolator. That is, the only significant information needed by such system is that of the relative times of occurrence (or positions of occurrence) of the zero-crossings of the input signal to the system. From that information only, the system is capable of interpolating between such occurrences so as to provide the bandlimited $S_{RZ}(t-T_0)$. The FIG. 20 system is thus to be distinguished from pulse filtering networks and the like wherein the energy content of the input pulse as well as its time of occurrence are significant factors in the operation of the network. That is, the operation of the FIG. 20 system does not essentially depend on the presence therein of any bandwidth limited filters.

Having discussed an exemplary application of a BTF to generate approximations of signals which are essentially non-bandlimited, the remainder of the present disclosure will be largely directed to the topic first considered, namely, the use of BTF apparatus for synthesizing bandlimited functions.

MANUFACTURABILITY

The R-matrix is the only segment of a BTF which may require special manufacturing techniques. Three related factors must be considered: (1) the precision with which resistors (or equivalent, perhaps active, circuit elements) can be supplied to specified values, (2) variations in the voltage swings of the various register stages, and (3) loading effects. All three factors influence the fidelity of the BTF output, and overall tolerances can be determined by extending the preceding analyses. It can be said, as a gross generalization covering most potential applications, that resistors for slow register stages need only be un-selected 1 to 5 percent tolerance units of the correct nominal value. Fast register stages which determine the "large" portions of the output, may require quite precise matching between resistors and individual stages.

Volume production of BTF's can be effected by automated etching or deposition techniques which will trim individual resistors as needed. Alternatively, factors (2) and (3) above can be eliminated via clamping and buffering. This "decouples" the R-matrix from the register, and enables the function of a BTF to be changed via different plug-in R-matrices.

EFFICIENCY

The examples of BTF's discussed earlier are inefficient in the sense that most of the power supplied to them is dissipated as heat. This occurs because shift register stages are usually voltage sources which the resistors in the matrix convert to controlled current sources. Tapered power supplies offer a partial solution to the efficiency problem; for example, fast registers can be operated at higher supply voltages than slow registers. Better solutions can be based on electrically different register stages. In practice, however, efficiency in this sense is probably of real significance only in aerospace applications.

REFLECTION PRINCIPLES

The functions likely wanted to be generated in practice are often either even or odd. If an analog LTI transversal filter were to be used as a generator, a suitable reflective termination of the delay line (open circuit for even functions, short circuit for odd) would allow the complexity of the filter to be halved. This simplification does not carry over in respect to the number of register stages required for BTF's. That is, one cannot shorten the register given merely evenness or oddness. On the other hand, one can halve the R-matrix (which is often the most expensive part of a BTF). To do this, one can couple, via digital logic or small current sharing resistors, single matrix resistors to pairs of stages whose members are symmetrically displaced about the register's midpoint.

Figure 21:
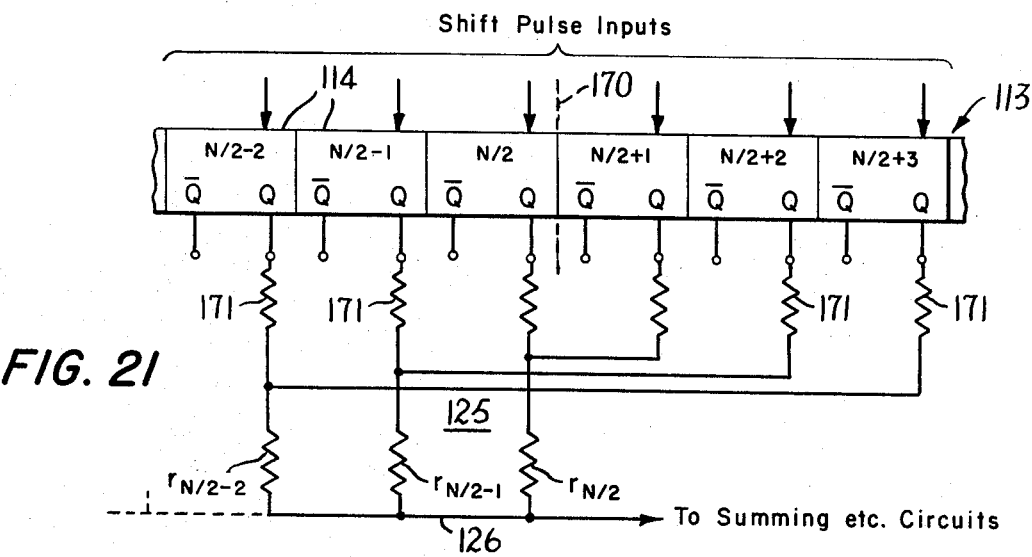
FIG. 21 is a schematic diagram of a modification of the BTF's of FIGS. 3, 5 or 8.

The arrangement just described is shown in FIG. 21 which pertains to a modification of the BTF apparatus of FIG. 3 or FIG. 5 or FIG. 8. In FIG. 21, dash line 170 represents the middle point of a shift register 113 having an even number N of stages 114, only the stages near that midpoint being depicted. The resistor matrix 125 is comprised in this instance of one-half N weighting resistors connected as before to the stages to the left of midpoint 170 except for the interposition of an isolating resistor 171 between the selected output terminal of each such stage and the weighting resistor coupled to that stage. That is, if we designate the stages shown in FIG. 21 as $N/2-2$, $N/2-1$, $N/2$ and so on (to indicate the numerical position of each such stage in the length of register 113), then the stages $N/2-N/2-1$ and $N/2$ are connected (through isolating resistors 171) to, respectively, the weighting resistors $N/2-2$, $N/2-1$ and $N/2$.

Rightward of midpoint 170, the stages 114 are connected to the same weighting resistors as are the stages leftward of the midpoint. That is, the stages $N/2+1$, $N/2+2$ and $N/2+3$ are connected through respective isolating resistors 171 to, respectively, resistors $N/2$, $N/2-1$ and $N/2-2$. Each of the one-half N resistors is, therefore, connected to a pair of stages which are respective to that resistor and which are displaced from midpoint 170 by the same number of stages. Hence, during shifting of a load pulse through the register each resistor is used twice, first, to weight the output from the associated stage leftward of point 170 and, second, to weight the output of the associated stage which is rightward of that point.

In the FIG. 21 apparatus, each of the two stages for each weighting resistor is coupled thereto by the same one of the Q and $\bar{Q}$ output terminals provided by each stage. Accordingly, the FIG. 21 apparatus is adapted to generate a staircase waveform signal approximately an even function such as the exemplary sinc function 124 (FIG. 3b). Alternatively, one and the other of the two stages for each resistor may supply out-puts thereto by, respectively, a Q terminal and a $\bar{Q}$ terminal so that the BTF is adapted to generate an approximation to an odd function, as, for example, the odd function staircase waveform signal shown in FIG. 18(c). In either instance, the signal which is generated will be symmetrical in magnitude about the center part of the signal.

BANDPASS SYNTHESIS

Bandpass waveforms can be synthesized directly using the BTF techniques described earlier, but the register lengths and shift rates may be uneconomically large if the center frequency exceeds the bandwidth significantly. Also, scale (shift rate) changes will affect the center frequency as well as the bandwidth of the waveform. A different approach, wherein bandpass waveforms are decomposed into modulated cophase and quadrature lowpass components, is more promising.

Let $s(t)$ be a bandpass waveform whose spectrum vanishes outside the intervals $\omega_0 < |f| < \omega_0 + W$. It can be described via the conventional SSB equation:

$$s(t) = s_L(t) \cos \omega_0 t - \hat{s}_L(t) \sin \omega_0 t \quad (31)$$

where $s_L(t)$ is a lowpass signal of bandwidth W Hz., and $\hat{s}_L(t)$ is the H-transformed (—90° phase shifted) version of $s_L(t)$. BTF methods can be used to generate $s_L(t)$, and then conventional SSB technology can be exploited to obtain $s(t)$. Alternatively, one can avoid some of the problems associated with the conventional means of SSB generation by generating $s_L(t)$ and $\hat{s}_L(t)$ in separate BTF's and then using the simplified version of the phase-shift method shown in FIG. 22.

Figure 22:
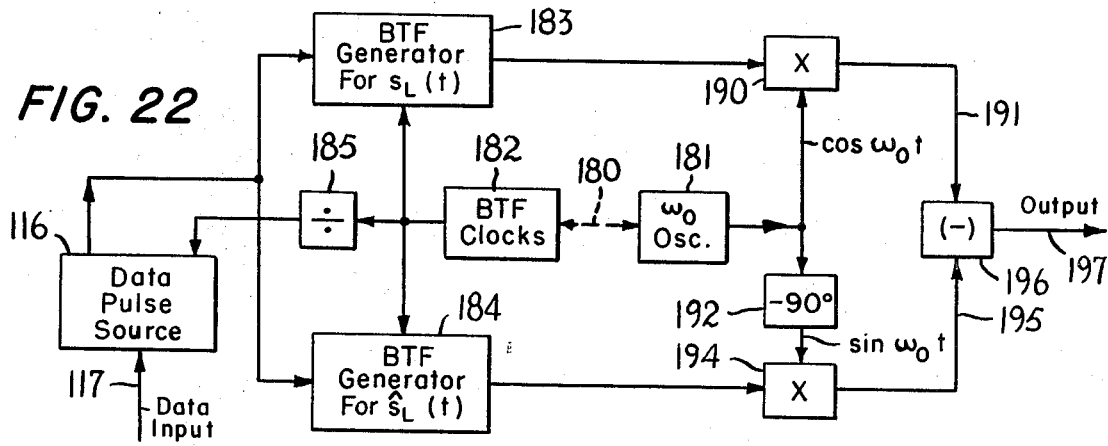
FIG. 22 is a schematic diagram of a system employing a plurality of BTF's (as per FIG. 3, 5 or 8 and modifications) to generate a bandpass signal.

In FIG. 22 the dash line arrow 180 indicates synchronization between a source 181 of a carrier signal cos $\omega_0 t$ and a clock pulse source 182 which supplies clock pulses as shift pulses to two BTF generators 183 and 184. The clock pulses from source 182 are also applied to a pulse divider 185 which responsively supplies synchronized clock pulses with a lower p.r.f. to the data pulse source 116. Elements 182–185 of the FIG. 22 system may be essentially similar to the elements of corresponding function in any of the BTF devices of FIGS. 3, 5 and 8. The BTF generators 183 and 184 (which, in FIG. 22, are each comprised of a shift register, weighting means, and summing means with or without additional filter means and/or integrating means as heretofore described) are essentially similar in structure and operation excepting that the weighting pattern of generator 183 is chosen to produce a modulating signal $S_L(t)$, whereas the weighting pattern of generator 184 is chosen to produce a modulating signal $\hat{S}_L(t)$ which is the Hilbert-transformed version of $S_L(t)$.

The modulating signal from generator 183 and the carrier signal cos $\omega_0 t$ are supplied to a modulator unit 190 which responsively generates on lead 191 the modulated signal $S_L(t) \cos \omega_0 t$. A 90° phase shifter 192 converts the carrier signal cos $\omega_0 t$ to the signal sin $\omega_0 t$. The latter signal is then applied along with the modulating signal from generaor 184 to a modulator unit 194 which responsively develops the modulated signal $\hat{S}_L(t) \sin \omega_0 t$ on lead 195. The modulated signals on leads 191 and 195 are then differentially combined in subtractor 196 to yield the desired bandpass signal on output lead 197.

Variations on (31) may also prove convenient in some instances. For example:

$$s(t) = s_C(t) \cos (\omega_0 + \pi(W)t \\ - s_Q(t) \sin (\omega_0 + \pi W)t \quad (32)$$

where $s_C(t)$ and $s_Q(t)$ are signals of bandwidth $\pm W/2$ Hz. (32) can be implemented with a relabelled version of FIG. 22.

REDUNDANT CODING

Figure 23:
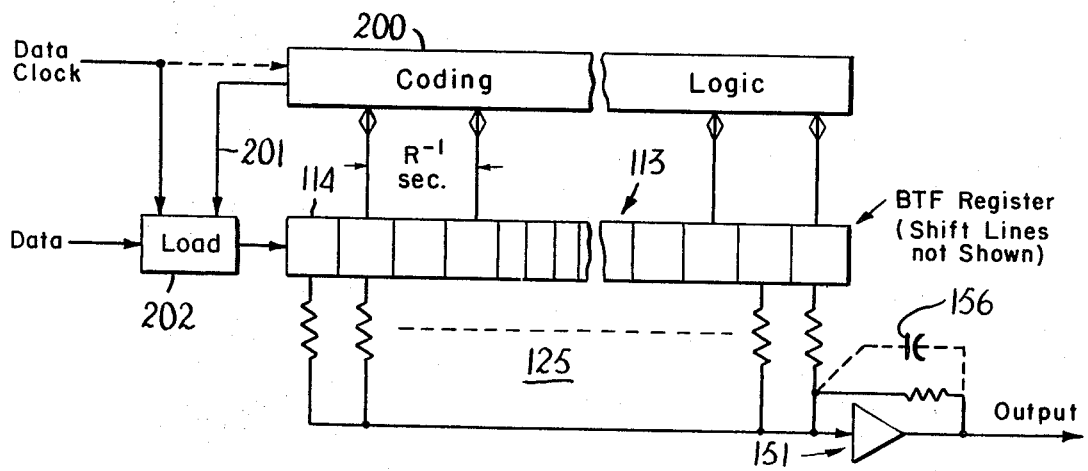
FIG. 23 is a schematic diagram of a BTF system as per FIG. 3, 5 or 8 (and modifications) in which the "free" storage capability of the system is employed.

BTF generators can be exploited as a source of "free" storage in systems which employ systematic redundant codes. FIG. 23 illustrates this capability. The sinc² Wt generator cited earlier, for example, stores eight digits and the "coding logic" 200 in FIG. 23 can be designed to compute a block check number, to implement a simple convolutional code, etc., and to supply via lead 201 either redunant pulses or pulses which control the flow of the data pulses from the load 202 to the input of shift register 113. The coding capabilities grow with the fidelity one demands from the generator, since both are dependent on the length of the register.

ASYNCHRONOUS OPERATION

BTF generators are intrinsically clocked or internally synchronous devices. They can be used in asynchronous systems, however, if a buffer stage is provided at the input; asynchronous data pulses can load the buffer, and the slow shift clock can reset it. This mode of operation results in quasi-synchronous outputs. Various alternatives, such as a shift clock which is turned-on for a predetermined cycle by the arrival of a data pulse, are also feasible.

Figure 24:
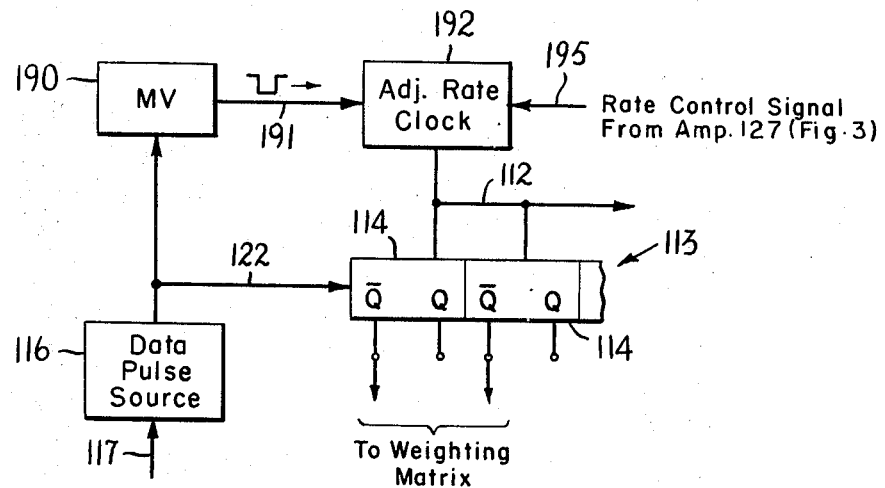
FIG. 24 is a schematic diagram of a modification applicable to the BTF's of FIGS. 3, 5 or 8 and in which the timing of shift pulses is controlled as a function of the timing data pulses to effect synchronization between these two types of pulses.

FIG. 24 shows how any of the previously described BTF's may be modified for operation in instances where the pulse positions 121 for the load pulses 120 (FIG. 3a) are variable in rate or are otherwise not standardized. In the FIG. 24 modification the data pulses are fed both to the input of the N stage register 113 and to a monostable multi-vibrator 190. Element 190 responds to each received load pulse to generate on lead 191 a gating signal applied to clock 192 which may be comprised of a pulsed oscillator and waveshaping circuits for deriving clock pulses from the sinusoidal output of the oscillator. Circuits appropriate to provide clock 192 are described in the text Waveforms, M.I.T. Radiation Laboratory Series, vol. 19 (McGraw-Hill, 1949). Clock 192 responds to the leading edge of the received gating signal to synchronously generate the first clock pulse in a train thereof and to supply at least N shift pulses (and, preferably, somewhat more than N shift pulses) for register 113 during the duration of the gating signal. When the gating signal ends, the generation of the train of clock pulses also ends. While FIG. 24 shows the clock pulses as being applied to shift line 112 which serves all the register stages (FIG. 3) so that the register 113 is characterized by constant-rate shifting, alternatively the FIG. 24 modificaton is adapted for use in a BTF employing variable rate shifting as described in connection with FIG. 8. In either instance, the rate (or the slowest rate) of the shift pulses applied to register 113 exceeds the fastest rate of occurrence of the data pulses by a factor M where M has a value of at least two (and, preferably, a much greater value) but here is not necessarily an integer.

Inasmuch as the leading edge of the gate signal on lead 191 is synchronized with the data pulse causing that signal and, moreover, the start of generation of clock pulses by clock 192 is synchronized with that leading edge, clock 192 will respond (through multivibrator 190) to each data pulse to generate a train of N or more clock pulses synchronized in timing with that data pulse. Thus, the FIG. 24 scheme provides shiftings of successive data pulses through register 113 in synchronism with the occurrences of those data pulses even though such data pulses may be asynchronous among themselves.

On the other hand, when there is a single register, the duration of each gating signal and the consonant duration of the train of clock pulses produced by that signal must be no greater than the shortest period between two consecutive data pulses because, otherwise, the second pulse would enter the register during generation of the train of clock pulses induced by the first data pulse and, accordingly, would lack a synchronous relation with the clock pulses of that train.

The limitation just stated can be overcome by utilizing a plurality of FIG. 24 circuits with a common data pulse source 116, connecting a common weighting matrix in the same way to the register of each of those circuits, interposing between pulse source 116 and those circuits a commutative switch which switches successive data pulses to the registers of one after another of such circuits in a predetermined cyclical switching pattern and providing that the gating signals employed in such circuits each have a duration which is no greater than the shortest time of completion of a switching cycle.

A BTF with the FIG. 24 mode of synchronization is adapted for the applications already described and for other special applications as follows.

The oscillator portion of clock 192 may be a variable frequency oscillator adjustable in rest frequency by, say, hand and further controlled in frequency after being gated "on" by a rate control signal at lead 195 so as to shift at a variable shift rate through the register 113 the load pulse then supplied thereto. Such rate control signal may be provided in various ways. For example, the gating signal for clock 195 may also gate "on" a generator (not shown) of a rate control signal which is of triangular or other center-peaked waveform so as to cause the shift rate for a load pulse in the register to be slowest when the load pulse is at the register ends and fastest when the load pulse is in the middle of the register. The resulting staircase signal from the BTF will then be composed of steps of variable width like those of the signal 135 of FIG. 8b excepting that the width variation will approach closer to being a continuous variation.

Figure 8B:
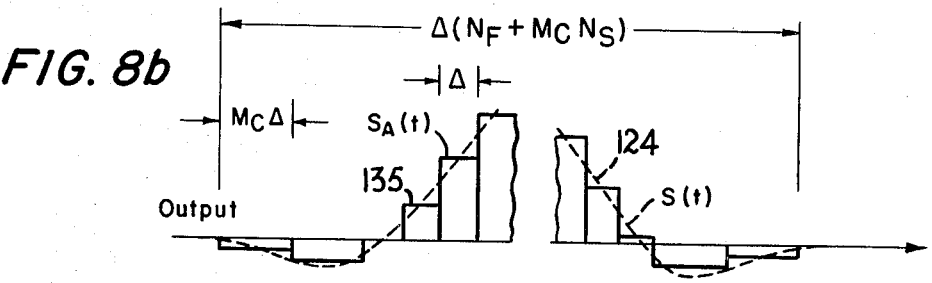

As another example, instead of using a separate generator to develop the rate control signal of desired waveform, the staircase signal from the amplifier 127 of the FIG. 3 BTF or from the BTF generator 150 of FIG. 5 may be fed as the rate control signal to the clock 192 such that, when such staircase signal is an approximation to, say, the sinc function represented in line 124 by FIG. 8b, that signal will automatically cause its component steps to have a width variation like that characterizing the steps of the signal 135 of FIG. 8b but more nearly approaching a continuous variation. To render the width of the steps a function of the rate of change of amplitude of the staircase signal rather than of its amplitude, the "smoothed" signal at the output of the filter 128 of the FIG. 3 BTF may be fed as a rate control signal to clock 192 through a differentiating circuit which is adjustable in gain to compensate for adjustments in the rest frequency of the clock. To obtain the same effect with the FIG. 5 circuit using only one integrator, it would be necessary to pass the output signal from filter 128 through a double differentiating circuit.

MULTI-PULSE EXCITATION

Binary sequential linearity ensures that the response of a BTF is defined by a convolution-type equation for any sequence of input pulses spaced $\Delta$ sec. apart (where $\Delta$ is defined as in FIGS. 3 and 5). Thus, one can define meaningfully a "step response" and a "square wave response" for a BTF. One can also vary to some extent a BTF's data-pulse response by causing the data pulse to insert not just a single input pulse as in FIG. 3, but a (short) redundant sequence of 1's and 0's spaced $\Delta$ sec. (not M$\Delta$ sec.) apart. The comparable analog LTI procedure is the use of input-pulse shaping to trim a filter's temporal response.

Figure 25:
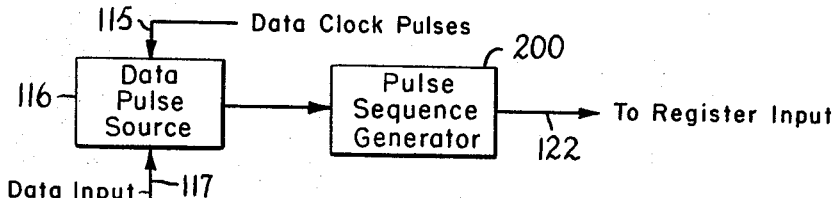
FIG. 25 is a schematic diagram of a modification applicable to the BTF's of FIGS. 3, 5 or 8 to provide multi-pulse excitation.
Figure 26:
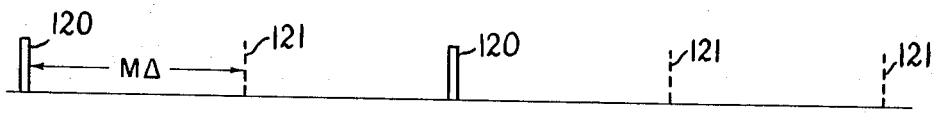
FIGS. 26 and 27 are pulse diagrams explanatory of the operation of the FIG. 25 modification.
Figure 27:
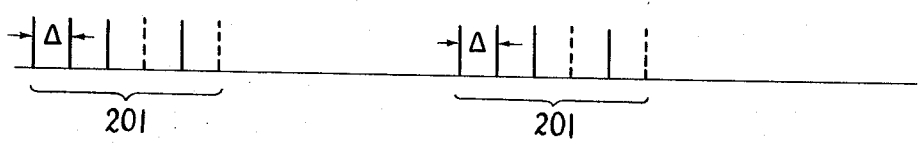

As shown by FIG. 25, the means for effecting multi-pulse excitation may take the form of a pulse sequence generator 200 interposed between the data pulse source 116 and the input of the BTF register. Generator 200 responds to each data pulse from source 116 to supply to the register a coded sequence of "1" and "0" pulses, the same coded pulse sequence being used for every data pulse during any one run. FIGS. 26 and 27 show the relationships between data pulses 120, data pulse positions 121 and corresponding exemplary pulse code sequences 201 of which one is generated in response to each data pulse. It will be noted that the same coded pulse sequence 201 is used in place of each data pulse as an input to the register and, also, that each sequence 201 has an overall period not greater than the period M$\Delta$ between consecutive data pulse positions. Further, it will be noted that (considering a pulse position as a "0" pulse) the several pulses of each sequence 201 are spaced by periods of $\Delta$, and the exemplary coding which characterizes each sequence is "111010." Each code sequence 201 is the full practical equivalent of a single data pulse.

Absent the pulse sequence generator 200 of FIG. 25, the register of any of the described BTF's is responsive to pulse units of which each consists of a single data pulse. The slowest register shift rate is then, as stated, at least twice greater than the fastes rate of occurrence at the input to the register of the load pulses shifted therethrough. When generator 200 is added, the pulses of each squence 201 are shifted as load pulses through the register at a rate which is not necessarily at least twice greater than the fastest rate of occurence of the pulses in that sequence. Nonetheless, because the sequences 201 are pulse units which are one-for-one substitutes for the data pulses 120 and, hence, cannot occur any faster than those data pulses, even with the addition of generator 200, the register shift rate (or slowest register shift rate) is at least twice greater than the fastest rate of occurrence of the pulse units to which the register is responsive.

MULTI-LEVEL SIGNALLING

Our discussion has been tacitly restricted thus far to binary signalling. It can be extended easily to include multi-level signalling, which is a form of quantized AM, by adopting the coding principle embodied in PCM. (Note that simple amplitude modulation of the input or output of a BTF generator will not suffice. Output AM fails because the output is often a sequence of *overlapping* signalling waveforms. Input AM fails because a BTF's register is a binary device . . . but therein lies the key to the extension.)

Figure 28:
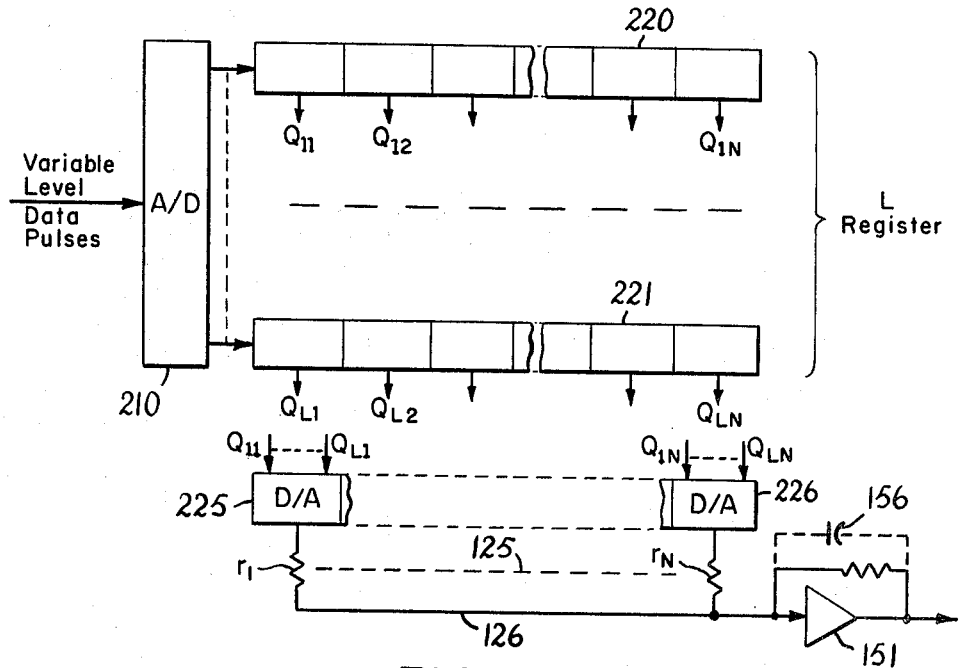
FIG. 28 is a schematic diagram of a system employing BTF's as per FIGS. 3, 5 or 8 for effecting multi-level signalling.
Figure 29:
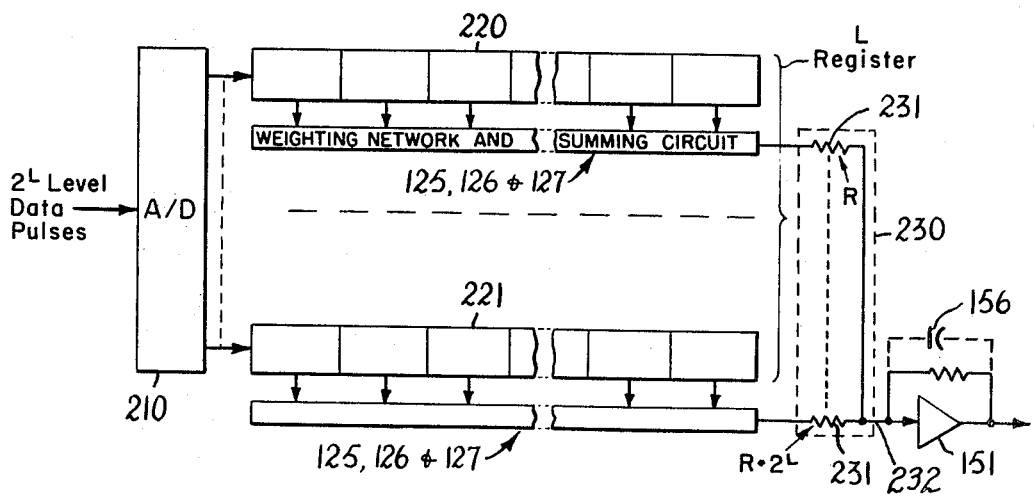
FIG. 29 is a schematic diagram of a system which is a variant of that of FIG. 28.

FIGS. 28 and 29 show two equivalent schemes for generating multi-level signals. FIG. 28 can be viewed as an amplitude- and time-quantized version of a conventional LTI transversal filter, for its essence is a multi-register "delay line" operating on PCM principles. N binary-to-$2^L$-level converter circuits, but only one set of matrix resistors, are needed. FIG. 29 employs L identical BTF generators, and therefore L matrices of resistors, but only one D/A circuit. The choice between the two schemes, and variations thereon, is likely to rest mainly on manufacturing costs.

Note that the complexity of multi-level generators grows only as L, the logarithm of the number of levels.

To elaborate on FIG. 28, an analog-to-digital converter 210 receives a succession of data pulses of which each may be defined as having one of $2^L$ levels on the understanding that the absence of a data pulse with energy content at a predetermined pulse position is considered to be a zero level or "0" pulse. Thus, if $L=5$, then each data pulse may be defined as a pulse having one of the amplitude levels "0" to "31."

The device 210 converts each received data pulse into a multidigital binary number or code having L binary digits or bit positions and formed by a set of L (in number) "1" or "0" pulse signals from the converter. A code produced from a received data pulse is representative of the level of that pulse by having a "1" signal in the first digit position in the code correspond to an analog value of 1, and by having a "1" signal in each following digit position correspond to an analog value twice as great as that associated with the next preceding position. Thus, level 27 is represented in $2^5$ coding by the code 11011 (because $27=16+8+0+2+1$). Note, however, that the mentioned different analog values are associated with signal positions in the code rather than with the signals occupying those positions, and that the signal at any such code position is either a "0" signal (i.e., no signal at all) or, alternatively, a "1" pulse having a standard "1" strength, the same as that of any other "1" pulses.

The L (in number) pulse signals at the output of A/D converter are each fed to a respective one of L (in number) BTF registers of which only registers 220 and 221 are shown. The L registers all have N stages and are otherwise identifiable and are supplied with the same shift pulses from a connon clock means (not shown). The first stages of all L registers are all connected by either all Q terminals of all Q̄ terminals to a first digital-to-analog converter 225 which weights the output of each stage in proportion to the analog value associated with the code position of the pulse signal fed to that stage, and which, thereafter, adds together the weighted outputs from all the stages coupled thereto so as to generate an output pulse with a level commensurate with that of the received data pulse. Converter 225 may be a conventional D/A device comprised of (a) L resistors which weight the outputs of the first stages of the 1st, 2nd . . . Lth registers in the ratios of 1, 2 . . . $2^L$, respectively, and (b) conventional summing means for the weighted outputs. The output pulse of converter 225 is supplied to the weighting resistor $r_1$ of the resistor matrix 125 providing a weighting pattern approximating a desired signal $s(t)$ (as in the FIG. 3 BTF) or a derivative of that desired signal (as in the FIG. 5 BTF).

Similarly, each successive set of stages of the L registers which all occupy the same numerical position in the N stage length of the registers are connected to a D/A converter like 225, and the output of that converter is connected to the corresponding resistor of waveform shaping matrix 125. For example, the Nth stages of all L registers are all connected to a D/A converter 226 whose output is connected to resistor $r_N$ of the waveform shaping matrix. As before, the common line 126 of resistor matrix 125 is connected to a summing means alone (where it is intended to generate a staircase signal approximating $s(t)$ as in FIG. 3) or to summing and integrating means (where it is intended to generate a staircase signal approximating a derivative of $s(t)$ as in FIG. 5).

From what has been said, it will be evident that the FIG. 28 apparatus will respond to a data pulse in the same way as before described in relation to FIGS. 3, 5 or 8 excepting that the output signal produced by the apparatus for each data pulse will not only approximate a desired waveshape but, in addition, will have an amplitude proportional to the level of that data pulse.

In connection with FIG. 28, it should be noted that, since the A/D converter 210 will resolve the amplitude of a received data pulse into $2^L$ levels whether the data pulse amplitude varies continuously or in discrete level steps from one data pulse to another, while received data pulses can be discrete level pulses, they need not be such pulses but, instead, may be characterized by unconstrained variability in amplitude below the maximum amplitude which converter 210 can resolve. It should also be noted that the earlier described techniques of variable rate shifting (FIGS. 8 and 24), control of the timing of the shift pulses by the data pulses (to effect synchronization therebetween (FIG. 24), generation of symmetrical waveforms by half-N weighting matrices (FIG. 21) and multi-pulse excitation (FIG. 25)) are applicable to the FIG. 28 apparatus. Multi-pulse excitation is effected in the FIG. 28 system by the use of L pulse sequence generators 200 (FIG. 25) of which each is connected between a respective one of the outputs of A/D converter 210 and the register supplied from that output, and of which each generates the same coded pulse sequence.

The FIG. 29 system is the same as that of FIG. 28. except that in FIG. 29 the weighting used for D/A conversion and the weighting used for waveform shaping are conjugated relative to the weightings used for the same purposes in FIG. 28. Specifically, in the FIG. 29 system, the stage outputs of the L identical registers are coupled to L identical waveform shaping matrices 125 of which each is associated with and receives the stage outputs of a respective one of the registers. The summing circuit 127 associated with each of these matrices is coupled to a respective one of the L inputs of a single digital-to-analog converter 230 comprised of a matrix of L resistors 231 adapted to weight in the ratios of 1, 2, 4 . . . $2^L$ the staircase signals supplied in a respective manner to those sersistors and supplied from the matrices 125. The weight imparted to each staircase signal corresponds to the analog value associated with the particular binary code signal (at the output of device 10) from which that staircase signal was derived. The weighted outputs of the D/A resistors 231 appear on a common line 232 and are summed to form a staircase signal which (as in the FIG. 28 system) is commensurate in amplitude with the level of the input data pulse initiating that signal.

CONCLUSION

The above described embodiments being exemplary only, it is to be understood that the additions thereto, modifications thereof and omissions therefrom can be made without departing from the spirit of the invention, and that the invention comprehends embodiments differing in form and/or detail from those specifically disclosed. For example, the invention is of application to binary transversal filters having adaptive weighting matrices or employed for generation of sets of orthogonal base signals. Moreover, the invention has numerous other applications not specifically discussed herein. Accordingly, the invention is not to be considered as limited save as consonant with the recitals of the following claims.

I claim:

1. Apparatus for producing an output signal having a predetermined waveform from a pulse input signal comprising, a digital shift register comprised of a plurality of stages responsive to the shifting therethrough of a load pulse corresponding to an input pulse to produce respective outputs for each stage indicative of the presence in that stage of such load pulse, a source of input pulses coupled to the input of said register, a source of shift pulses coupled to said register to shift the load pulses corresponding to said input pulses through successive stages of said register, said shift pulse source providing a plurality of pulse trains having different pulse rates, said different pulse trains being applied to respective different groups of the stages of said register so as to effect shifting of load pulses at different rates through said different register stages, weighting elements coupled to said stages to weight the outputs thereof, and means for combining the weighted outputs from said elements to derive composite signals therefrom.

2. Apparatus as in claim 1 in which a separate weighting element is coupled to each of said stages of said register.

3. Apparatus as in claim 1 in which each of said weighting elements is coupled to a pair of register stages, each of said stages being spaced by the same number of stages from a common point in the length of said register.

4. Apparatus as in claim 1 in which said shift pulses include trains of high and low repetition rate, said high and low rate shift pulses being separately applied to respective different groups of register stages along the length of said register so as to produce shifting of load pulses through one of said groups of stages relatively faster than through another of said groups of stages.

5. Apparatus as in claim 4 in which each of said trains of shift pulses are of constant repetition rate and wherein said high rate pulses are applied to a consecutive group of register stages centrally disposed in the length of said register and said low rate pulses are applied to each of two groups of consecutive register stages disposed along said register on opposite sides of said central stages.

6. Electrical pulse apparatus comprising, a digital shift register comprised of a plurality of stages responsive to the shifting therethrough of a load pulse corresponding to an input pulse to produce respective outputs for each stage indicative of the presence in that stage of such load pulse, a source of input pulses coupled to the input of said register, a source of shift pulses coupled to said register to shift the load pulses corresponding to said input pulses through successive stages of said register, a plurality of weighting elements, each of said weighting elements being coupled to a pair of register stages respectively spaced by the same number of other register stages from a common point along the length of said register, whereby each of said weighting elements receives and weighs the outputs of two of said register stages, and means coupled to all of said weighting elements to derive composition signals from the weighted outputs thereof.

7. Electrical pulse apparatus comprising, a digital shift register comprised of a plurality of stages responsive to the shifting therethrough of a load pulse corresponding to an input pulse to produce respective outputs for each stage indicative of the presence in that stage of such load pulse, a source of input pulses coupled to the input of said register, a rate variable source of shift pulses coupled to said register to shift the load pulses corresponding to said input pulses through successive stages of said register, means coupled to said register stages for weighting and summing the outputs thereof to derive from such outputs a signal characterized by a time variation in amplitude, and means coupled to said source of shift pulses and responsive to the variation in amplitude characteristic of said signal to vary the rate of said shift pulses in accordance therewith.

8. A bandpass system comprising a source of input pulses, a plurality of binary transversal filters coupled to said source and respectively responsive to said input pulses to derive therefrom modulating signals of selected waveform characteristics, a carrier wave source, a plurality of modulating means each coupled to receive said carrier wave and the modulating signal from one of said filters and to modulate said wave by said signal, and means for combining the modulated waves from said modulating means to provide an output in the form of a bandpass signal.

9. The system of claim 8 comprises two binary transversal filters, one of said filters adapted to produce a modulating signal having a given waveform characteristic and the other of said filters adapted to produce a modulating signal which is the Hilbert transformed version of said given waveform characteristic.

10. The system of claim 9 further comprising phase shifting means coupled between said carrier wave source and the modulating means for said other of said filters, whereby the carrier wave supplied to the latter is different in phase from that supplied to said one of said filters.

11. The system of claim 10 wherein said means for combining the modulated waves subtracts said waves.

12. The system of claim 8 wherein each of said binary transversal filters comprises, a digital shift register comprised of a plurality of stages responsive to the shifting therethrough of a load pulse corresponding to one of said input pulses to produce respective outputs for each stage indicative of the pressure in that stage of such load pulse, a source of shift pulses coupled to said register to shift the load pulses corresponding to said input pulses through successive stages of said register, weighting elements coupled to said stages to weight the outputs thereof, and means for combining the weighted outputs from said elements to derive composite signals therefrom.

13. The system of claim 12 wherein the shift pulses for the registers in all of said filters are supplied by a common source, and wherein said common shift pulse source is synchronized with said carrier oscillator.

References Cited

UNITED STATES PATENTS

| | | | |
|---|---|---|---|
| 3,050,700 | 8/1962 | Powers | 333—29 |
| 3,050,714 | 8/1962 | Campbell | 328—37 |
| 3,110,802 | 11/1963 | Ingham et al. | 235—150.53 |
| 3,297,951 | 1/1967 | Blasbalg | 328—37 |
| 3,303,335 | 2/1967 | Pryor | 235—181 |
| 3,315,171 | 4/1967 | Becker | 333—29 X |
| 3,348,150 | 10/1967 | Atal et al. | 333—29 X |
| 3,432,649 | 3/1969 | Landrum | 235—181 |

OTHER REFERENCES

Gouriet et al.: A Quadrature Network For Generating Vestigial-Sideband Signals, The Institution of Electrical Engineers, vol. 107–C, Paper No. 5054E, October 1959, pp. 253–260.

Morphet: Self Syncing Clock For Binary Data, IBM Tech. Discl. Bull., vol. 2, No. 4, pp. 64–65, December 1959.

EUGENE G. BOTZ, Primary Examiner

F. D. GRUBER, Assistant Examiner

U.S. Cl. X.R.

235—150.53, 181; 325—38; 328—38; 333—29, 70

PO-1050
(5/69)

UNITED STATES PATENT OFFICE
CERTIFICATE OF CORRECTION

Patent No. __3,543,009__　　　　Dated __November 24, 1970__

Inventor(s)　　　　　　H. B. Voelcker, Jr.

It is certified that error appears in the above-identified patent and that said Letters Patent are hereby corrected as shown below:

Col. 1, line 62, "viabe" should be --viable--; Col. 1, line 63, "widey" should be --widely--; Col. 2, line 27, "servie" should --service--; Col. 5, line 74, "R$^{-1}$M" should be --R$^{-1}$/M--; Col. line 5, "suming" should be --summing--; Col. 8, line 38, after "In" insert --the--; Col. 8, line 42, between "line" and "segme insert a hyphen (-); Col. 10, line 11, "directed" should be --desired--; Col. 10, line 67, before "BTF" insert --the--; Co. 10, line 74, after "finite" insert --stage--; Col. 11, line 18, "Fll." should be --Fig.--; Col. 11, line 30, end of equation, "$\frac{\tau}{N} \Delta$" should be -- $\frac{\tau}{N\Delta}$ --; Col. 11, line 47, after "BTF's" dele --process--; Col. 12, line 10, "represents" should be --represe Col. 12, line 53, after "width" insert --W--; Col. 14, line 66, "fortunatey" should be --fortunately--.

Col. 16, line 14, after "$|s_{RZ}(t)|$ •" insert --cos--; Col. 16, line 18 [equation 24], be "exp" insert -- = --; Col. 17, line 22, "physical" should be --physically--;

Col. 17, fig. 24c, end of equation, "t-T$_0$-t$_i$]" should be --t-T$_0$-t$_i$|]--; Col. 17, line 45, "quence" should be --sequence--; Col. 18, line 36, "the" should be --one Col. 18, line 73, "non-casual" should be --non-causal--; Col. : line 12, "cricuit" should be --circuit--; Col. 20, line 45, "10µs." should be --10µs--; Col. 21, line 65, cancel "charge due said cutter drum having an outlet opening"; Col. 22, line 46, "13g" should be --Fig. 13g--; Col. 22, line 60, "and" should be --to--; Col. 24, line 45, "N/2 - N/2 -1 and N/2" should be --N/2-2, N/2-1 and N/2--; Col. 25, line 15, "s(i) should be --s(t)--; Col. 25, line 18, "OFS$_L$(t)" should be --of S$_L$(t)--; Col. 25, line 59, "($\omega_0$+π(W)t" should be-($\omega_0$+πW)t--; Col. 25, l. 74, "redunant" should be --redundant--; Col. 28, line 7, "fast should be --fastest--; Col. 28, line 10, "squence" should be --sequence--; Col. 28, line 12, "occurence" should be --occurre Col. 28, line 55, "multidigital" should be --multidigit--; Col. 29, line 1, "identifiable" should be --identical--;

PO-1050
(5/69)

UNITED STATES PATENT OFFICE
CERTIFICATE OF CORRECTION

Patent No. 3,543,009        Dated November 24, 1970

Inventor(s)        H. B. Voelcker, Jr.

It is certified that error appears in the above-identified patent and that said Letters Patent are hereby corrected as shown below:

- Page 2 -

Col. 29, line 2, "connon" should be --common--; Col. 29, line 4 "of" should be --or--; Col. 30, line 3, "sersistors" should be --resistors--; Col. 30, line 10, "ampltude" should be --amplitu Col. 31, line 9, "weighs" should be --weights--; Col. 31, line 11, "composition" should be --composite--; Col. 32, line 11, "pressure" should be --presence--.

Signed and sealed this 2nd day of November 1971.

(SEAL)
Attest:

EDWARD M. FLETCHER, JR.
Attesting Officer

ROBERT GOTTSCHALK
Acting Commissioner of Patent